(12) United States Patent
Terpstra et al.

(10) Patent No.: US 12,079,638 B2
(45) Date of Patent: Sep. 3, 2024

(54) MANAGEMENT FRAMEWORK FOR MIXED REALITY DEVICES

(71) Applicant: MAGIC LEAP, INC., Plantation, FL (US)

(72) Inventors: Mark Ryan Terpstra, Parkland, FL (US); Lindsey Leigh Interlandi, Fort Lauderdale, FL (US); Ketki Hemant Jadhav, Plantation, FL (US); Zachary Adam Keener, Austin, TX (US); Guillaume Jeoffrey Charmes, Fort Lauderdale, FL (US); Nathan Riley Spiller, Austin, TX (US); Michel Ian Marrache, North Miami Beach, FL (US); David Campise, Winter Garden, FL (US); Rene Travieso, Plantation, FL (US); Shaun P. Collins, Sanford, FL (US); Shruti Salghur-Elliott, Naples, FL (US)

(73) Assignee: Magic Leap, Inc., Plantation, FL (US)

( * ) Notice: Subject to any disclaimer, the term of this patent is extended or adjusted under 35 U.S.C. 154(b) by 61 days.

(21) Appl. No.: 17/062,341

(22) Filed: Oct. 2, 2020

(65) Prior Publication Data
US 2021/0103449 A1 Apr. 8, 2021

Related U.S. Application Data

(60) Provisional application No. 62/983,079, filed on Feb. 28, 2020, provisional application No. 62/910,209, filed on Oct. 3, 2019.

(51) Int. Cl.
G06F 9/445 (2018.01)
G06F 21/31 (2013.01)
(Continued)

(52) U.S. Cl.
CPC ............ *G06F 9/4451* (2013.01); *G06F 21/31* (2013.01); *G06F 21/44* (2013.01); *G09G 3/001* (2013.01);
(Continued)

(58) Field of Classification Search
CPC .................................................. G09G 2354/00
See application file for complete search history.

(56) References Cited

U.S. PATENT DOCUMENTS 6,629,065 B1 9/2003 Gadh et al.
11,086,406 B1 * 8/2021 Ravasz ................. G06F 1/1686
(Continued)

OTHER PUBLICATIONS

Final Office Action for U.S. Appl. No. 16/839,727 dated Jun. 30, 2021.

(Continued)

*Primary Examiner* — Gustavo Polo
(74) *Attorney, Agent, or Firm* — Vista IP Law Group, LLP

(57) ABSTRACT

Disclosed are methods and systems for managing mixed-reality systems. These methods or systems authenticate and authorize a user into an authorized user at a management software application, identify one or more device management modules, and provision a set of management modules performing a set of respective functions to the authorized user. These methods or systems further receive, from at least one management module in the set based at least in part upon an instruction from the authorized user, and executing one or more management instructions, wherein execution of the one or more management instructions causes a state of a mixed reality device, and the mixed-reality device is operatively connected to the management software application.

17 Claims, 20 Drawing Sheets

(51) Int. Cl.
    G06F 21/44     (2013.01)
    G09G 3/00      (2006.01)
    H04L 9/06      (2006.01)
(52) U.S. Cl.
    CPC ....... *H04L 9/0637* (2013.01); *G09G 2354/00* (2013.01)

(56) References Cited

U.S. PATENT DOCUMENTS

| | | | |
|---|---|---|---|
| 2013/0278631 | A1 | 10/2013 | Border et al. |
| 2014/0225922 | A1 | 8/2014 | Sbardella |
| 2015/0143302 | A1 | 5/2015 | Chang et al. |
| 2015/0277699 | A1 | 10/2015 | Algreatly |
| 2016/0180602 | A1 | 6/2016 | Fuchs |
| 2016/0321378 | A1 | 11/2016 | Kagan et al. |
| 2017/0116415 | A1* | 4/2017 | Stopel .................... G06F 21/53 |
| 2017/0235848 | A1 | 8/2017 | Van Dusen et al. |
| 2017/0287218 | A1 | 10/2017 | Nuernberger et al. |
| 2018/0131788 | A1 | 5/2018 | Roberts |
| 2018/0144556 | A1 | 5/2018 | Champion et al. |
| 2018/0225885 | A1 | 8/2018 | Dishno |
| 2019/0156585 | A1 | 5/2019 | Mott et al. |
| 2021/0034725 | A1* | 2/2021 | Donley ................ H04R 1/1041 |
| 2022/0038463 | A1* | 2/2022 | Burlitskiy ............... G06F 21/43 |

OTHER PUBLICATIONS

Non-Final Office Action for U.S. Appl. No. 16/839,727 dated Nov. 9, 2021.
Non-Final Office Action for U.S. Appl. No. 16/839,727 dated Feb. 10, 2021.
Notice of Allowance for U.S. Appl. No. 16/839,727 dated Feb. 28, 2022.
Amendment Response to NFOA for U.S. Appl. No. 16/839,727 dated Feb. 7, 2022.
Amendment Response to NFOA for U.S. Appl. No. 16/839,727 dated May 10, 2021.
Amendment Response to FOA for U.S. Appl. No. 16/839,727 dated Sep. 30, 2021.
PCT International Search Report and Written Opinion for International Appln. No. PCT/US20/26656, Applicant Magic Leap, Inc., dated Jun. 22, 2020 (13 pages).
Extended European Search Report for EP Patent Appln. No. 20784393.9 dated Jun. 20, 2022.
Foreign OA for CN Patent Appln. No. 202080026322.7 dated Oct. 12, 2022 (with English translation).
Foreign Response for CN Patent Appln. No. 202080026322.7 dated Feb. 9, 2023.
Foreign Decision of Rejection for CN Patent Appln. No. 202080026322.7 dated Mar. 18, 2023 (with English translation).
Foreign Response for CN Patent Appln. No. 202080026322.7 dated Jun. 26, 2023.
Foreign Response for EP Patent Appln. No. 20784393.9 dated Jan. 5, 2023.
Foreign OA for JP Patent Appln. No. 2021-559089 dated Aug. 10, 2023 (with English translation).
Foreign Response for JP Patent Appln. No. 2021-559089 dated Oct. 30, 2023.
Non-Final Office Action for U.S. Appl. No. 17/804,394 dated Jan. 11, 2024.
Foreign NOA for JP Patent Appln. No. 2021-559089 dated Jan. 16, 2024.
Schmalstieg, D., et al., "The Studierstube Augmented Reality Project," Presence, vol. 11, No. 1, Feb. 2002, 33-54, @ 2002 by the Massachusetts Institute of Technology.
Szalavari, Zsolt, Erik Eckstein, and Michael Gervautz. "Collaborative gaming in augmented reality." Proceedings of the ACM symposium on Virtual reality software and technology. 1998. (Year: 1998).
Final Office Action for U.S. Appl. No. 17/804,394 dated Jun. 3, 2024.

* cited by examiner

- ❏ General:
    - ❖ id: //ID of profile
    - ❖ name: //name of profile
    - ❖ description: //description for the profile
    - ❖ support-message-for-device-user: //customizable, auto-generate msg
    - ❖ created-on: //YYYY-MM-DD HH:MM:SS
    - ❖ schema-version: //version number
    - ❖ org-id: //originator ID
    - ❖ org-name: //originator name
    - ❖ Offline profile updates : //whether the profile is allowed to be updated when device is not connected to the Internet
- ❏ Deice Settings:
    - ❖ Backup:
        - o editable: true
    - ❖ EULA:
    - ❖ Creator mode;
    - ❖ Factory-reset:
        - o editable: true
    - ❖ Date:
        - o editable: true
    - ❖ Time:
        - o editable: true
        - o format: 12
    - ❖ do-not-disturb:
        - o editable: true
        - o preset: false
- ❏ Connectivity:
    - ❖ Bluetooth: //allow or restrict adding new BT devices.
    - ❖ Wi-Fi: //preset or permissible Wi-Fi networks
- ❏ Privacy/Kiosk:
    - ❖ Editable: true
    - ❖ Preset: false
    - ❖ Package-names:
    - ❖ Cloud processing for spatial mapping
    - ❖ Shared world consent
    - ❖ Data sharing
    - ❖ Device pin:

FIG. 3B

MANAGEMENT FRAMEWORK FOR MIXED REALITY DEVICES

CROSS REFERENCE TO RELATED U.S. APPLICATIONS

This application claims the benefit of U.S. Prov. Pat. App. Ser. No. 62/910,209 entitled "MANAGEMENT FRAMEWORK FOR MIXED REALITY DEVICES" and filed on Oct. 3, 2019 and U.S. Prov. Pat. App. Ser. No. 62/983,079 entitled "MANAGEMENT FRAMEWORK FOR MIXED REALITY DEVICES" and filed on Feb. 28, 2020. The contents of the aforementioned U.S. provisional patent applications are hereby expressly incorporated by reference for all purposes.

This Application is related to U.S. patent application Ser. No. 16/839,727 entitled "METHODS, SYSTEM, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM" and filed on Apr. 3, 2020 and U.S. patent application Ser. No. 15/651,363 entitled "COMPLIANT MOUNTING ARM" and filed on Jul. 17, 2017. The contents of the aforementioned U.S. patent applications and provisional patent application are hereby expressly incorporated by reference for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computing and display technologies have facilitated the development of systems for so-called "virtual reality" (VR), "augmented reality" (AR) experiences, "mixed reality" (MR) experiences, and/or extended reality (XR) experiences (hereinafter collectively referred to as "mixed reality" and/or "MR"), where digitally reproduced images or portions thereof are presented to a user in a manner where they seem to be, or may be perceived as, real. A VR scenario typically involves presentation of digital or virtual image information without transparency to other actual real-world visual input, whereas an AR or MR scenario typically involves presentation of digital or virtual image information as an augmentation to visualization of the real world around the user such that the digital or virtual image (e.g., virtual content) may appear to be a part of the real world. However, MR may integrate the virtual content in a contextually meaningful way, whereas AR may not.

Applications of mixed reality technologies have been expanding from, for example, gaming, military training, simulation-based training, etc. to productivity and content creation and management. A mixed reality system has the capabilities to create virtual objects that appear to be, or are perceived as, real. Such capabilities, when applied to the Internet technologies, may further expand and enhance the capability of the Internet as well as the user experiences so that using the web resources is no longer limited by the planar, two-dimensional representation of web pages.

With the advent of MR systems and devices and the development therefor, MR systems and devices may bring about revolution to information technology and expand the applications of MR technologies to a new era beyond conventional applications such as gaming or mere Web browsing. For example, by hosting productivity software applications locally on MR systems or devices, by providing productivity software applications as services and/or micro-services through, for example, a cloud-based environment to MR systems or devices, or a combination of locally hosted productivity software application(s) and cloud-based software services may simply revolutionize conventional ways of corporate work culture, office arrangement, the manners in which co-workers collaborate and/or perform their daily productivity tasks, etc. For example, a business entity may adopt MR devices to replace conventional desktop computers and/or laptop computers. Although the benefits may be numerous, management a fleet of MR devices and systems for enterprise applications of MR technologies is nevertheless lacking.

Therefore, there exists a need for methods, systems, and computer program products for mixed reality systems management.

SUMMARY

Disclosed are method(s), system(s), and article(s) of manufacture for management of mixed reality systems in one or more embodiments. Some embodiments are directed at a method for managing various aspects pertaining to mixed reality systems.

In some embodiments, these techniques authenticate and authorize a user into an authorized user at a management software application, identify one or more device management modules, and provision a set of management modules performing a set of respective functions to the authorized user. These methods or systems further receive, from at least one management module in the set based at least in part upon an instruction from the authorized user, and executing one or more management instructions, wherein execution of the one or more management instructions causes a state of a mixed reality device, and the mixed-reality device is operatively connected to the management software application.

In some embodiments, these techniques of the method further redirect the authorized user to a landing page for a management portal provided by the management software application, determine a position or an orientation in a prism for the landing page for the management portal, and provision one or more virtual input modules to user or the authorized user for the management software application.

In addition or in the alternative, these techniques of the method may further create a new profile that is to be applied to the mixed-reality device. In some of these embodiments, creating a new profile may include presenting the new profile in a draft mode at least by setting a first state of the new profile to the draft mode, transforming the new profile into an edited profile at least by implementing one or more changes to the new profile in the draft mode, and updating the first state of the encrypted profile into an active mode.

In some of the immediately preceding embodiments, creating the new profile may further include storing the edited profile in a non-transitory computer accessible storage medium, and updating a second state of the edited profile into an approved state after the edited profile has been approved. In some other embodiments, creating the new profile may include updating the first state of the edited profile into a generated mode and encrypting the edited profile into an encrypted profile that has the generated mode.

In some embodiments, the set of acts may include configuring or modifying an existing profile pertaining to the mixed-reality device. In some of these embodiments, configuring or modifying the existing profile may include at least one of determining one or more permissible networks for the existing profile, restricting or limiting whether a first user of the mixed-reality device is allowed to manage the mixed-reality device by changing one or more settings pertaining to the mixed-reality device, restricting or limiting an operation mode of the mixed-reality device for the first user of the mixed-reality device, restricting or limiting one or more permissible software applications that are permitted to execute on the mixed-reality device, or restricting or limiting one or more impermissible software applications that are not permitted to execute on the mixed-reality device.

In some embodiments, the set of acts may further include applying a profile to the mixed-reality device. In some of these embodiments, applying the profile may include preparing the mixed-reality device, establishing a connection between the mixed-reality device and the management software application, and applying or installing the profile onto the mixed-reality device at least by modifying a state of the mixed-reality device with information or data in the profile.

In some of the immediately preceding embodiments, applying the profile may further include invoking or determining a device bridge module for the mixed-reality device and the management software application and validating a version of the device bridge module. In some embodiments, applying the profile may further include selecting the mixed-reality device from a pool of managed mixed reality devices presented in an interface of the management software application and provisioning a key for the profile to the mixed-reality device.

In some of the immediately preceding embodiments, applying the profile may further include updating one or more configurations for the mixed-reality device at least by editing or modifying a first existing profile pertaining to the one or more configurations for the profile or by creating a first new profile for the profile and removing data or information pertaining to one or more users from the mixed-reality device based at least in part upon the profile.

Some embodiments are directed at a hardware system that may be invoked to perform any of the methods, processes, or sub-processes disclosed herein. The hardware system may include or involve a mixed reality system having at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 3B illustrates a more detailed example profile for management of mixed reality systems or devices in one or more embodiments.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

It shall be noted that, unless the context requires otherwise, throughout the specification and claims which follow, the word "comprise" and variations thereof, such as, "comprises" and "comprising" are to be construed in an open, inclusive sense that is as "including, but not limited to."

It shall be further noted that Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Furthermore, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Various embodiments are directed to management of a virtual reality ("VR"), augmented reality ("AR"), mixed reality ("MR"), and/or extended reality ("XR") system (collectively referred to as an "MR system" or mixed-reality system) in various embodiments.

Figure 1A:
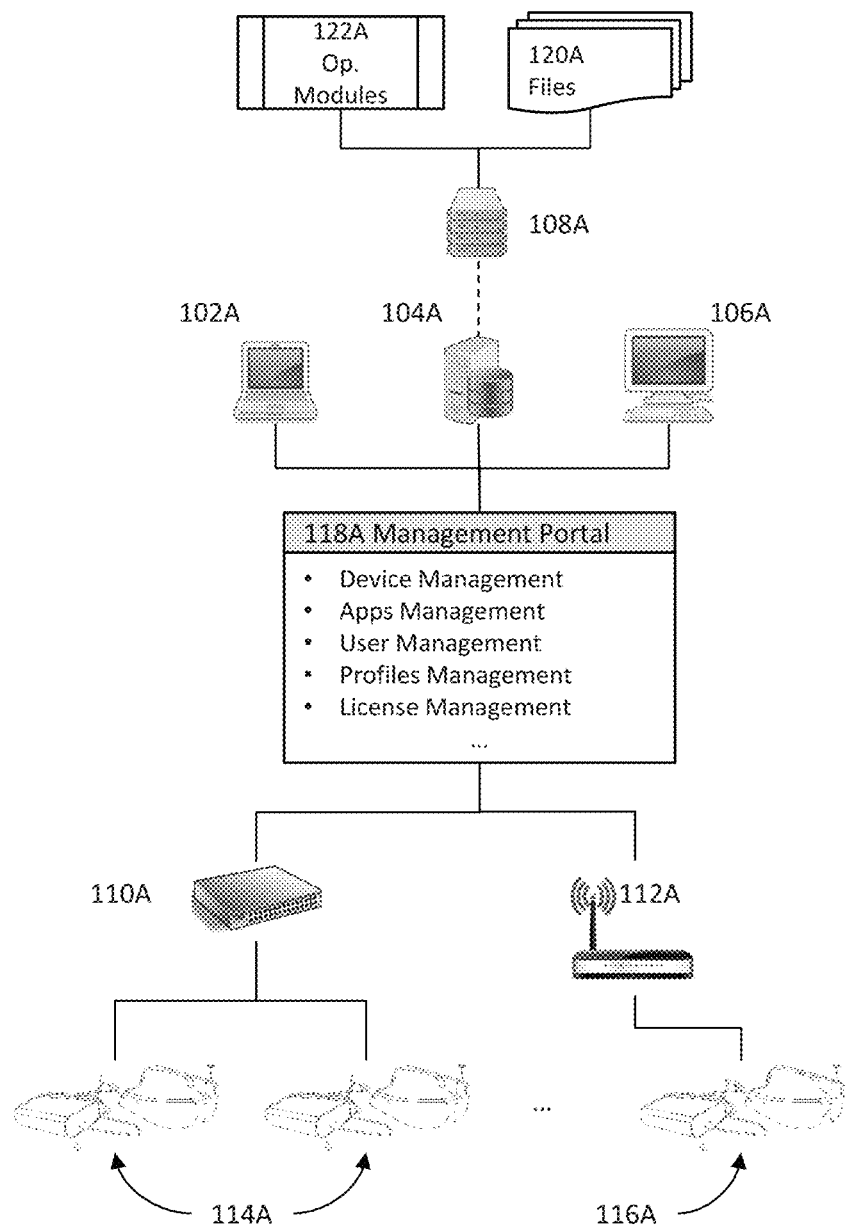
FIG. 1A illustrates a high-level block diagram of a simplified schematic platform for management of mixed reality systems or devices in one or more embodiments.

FIG. 1A illustrates a high-level block diagram of a simplified schematic platform for management of mixed reality systems or devices in some embodiments. These embodiments provide a management portal 118A of a management software application or software suite to facilitate the performance of various management functions pertaining to a plurality of MR devices or systems. In some of these embodiments, the plurality of MR devices or systems are managed by the administrator or one or more authorized users having sufficient privileges of a group (e.g., a company) and configured to execute one or more productivity software applications that are used for producing information for professional and/or business purposes of the group. Some examples of productivity software applications may include, without limitation, document editing software applications, presentation editing software applications, worksheet software applications, databases, charts, graphs, publishing software applications, note-taking software applications, email clients, groupware, communication software applications, personal information software applications, analysis software applications, digital paintings, images editing software applications, audios editing software applications, video editing software applications, time management software applications, project management, a collection of collaboration software applications, graphics software applications, CAD or computer-aided design software applications, CAE or computer-aided engineering software applications, etc.

A management software application may be installed on a server 104A accessible by an administrator or on a personal computer or workstation (e.g., a laptop computer 102A, a desktop computer or a terminal 106A, etc.) of the administrator. The management software application 118A or the computing device (e.g., 102A, 104A, or 106A) on which the management software application resides may access a distributed storage or storage 108A storing code modules, data, or information such as a plurality of operation modules 122A and a plurality of files or objects 120A.

The management software application may facilitate the performance of various management functions such as managing various aspects pertaining to MR devices, managing one or more locally installed and/or remotely provided software applications for MR devices, managing users of MR devices, managing other software (e.g., profiles, firmware, drivers, operating system, device bridge tools, SDKs or software development kits, etc.), managing licenses for MR devices, etc. The management portal 118 of the management software application may be used to aid an administrator to perform one or more functions described herein, when needed.

The management software application or the computing device on or through which the management software application executes may be respectively connected via one or more wired connections 110A (e.g., a USB or universal serial bus cable, a USB-C cable, an Ethernet cable, or any other types of cables capable of transmitting digital data) to one or more MR devices or systems 114A and/or via one or more wireless connections 112A (e.g., a Wi-Fi network connection, a cellular network connection, or any other suitable wireless network connections) to one or more other MR devices or systems 116A to facilitate the performing one or more management functions.

Figure 1B:
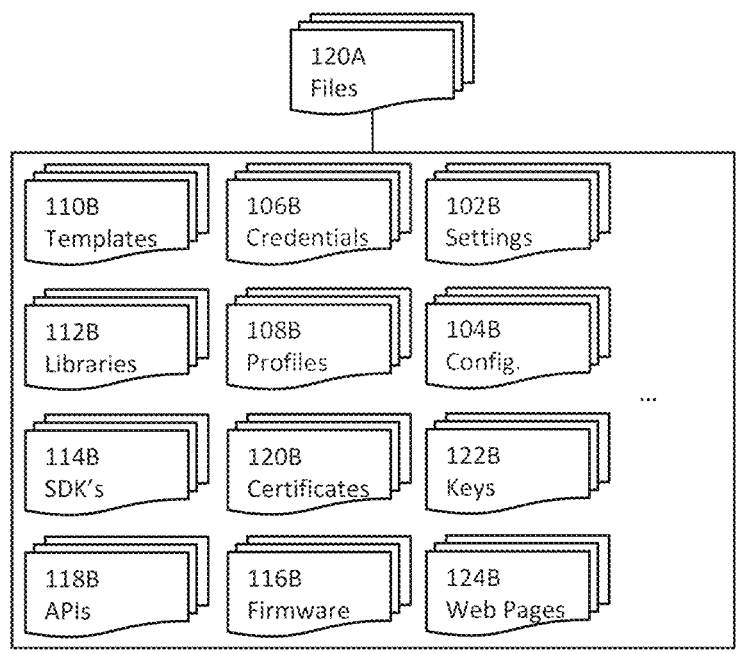
FIG. 1B illustrates another high-level block diagram of some examples objects that may be employed in a system illustrated in FIG. 1A for management of mixed reality systems or devices in one or more embodiments.

FIG. 1B illustrates another high-level block diagram of some examples objects that may be employed in a system illustrated in FIG. 1A for management of mixed reality systems or devices in some embodiments. More specifically, FIG. 1B illustrates some examples of files or objects 120A illustrated in FIG. 1A. In these embodiments, the plurality of files or objects 120A may include, without limitation, a plurality of settings 102B for one or more different MR devices or systems or one or more MR device types, the management software application, the computing device on or through which the management software application executes, or any combinations thereof. The plurality of files or objects 120A may further include one or more configurations for one or more MR devices or systems or one or more MR device types. For example, different users may have different privileges or authorizations to access different portions of the full capability of the same MR device. Different configurations may be predetermined and stored for such different privileges or authorizations as a part of the plurality of files or objects 120A.

The plurality of files or objects 120A may include one or more keys 122B, one or more credentials 106B for a user, and/or one or more certificates 120B that may be used in one or more authentication schemes and/or one or more authorization schemes. An authentication scheme comprises a software module that implements a way for a user to authenticate itself to, for example, an MR device, a management software application, etc. Various techniques described for MR devices or systems herein support various authentication schemes with multiple authentication protocols. For example, an MR device described herein may invoke a biometric authentication scheme that invokes an image capture device (e.g., an inward-facing camera) that captures an image or a sequence of multiple images of a part of a user (e.g., a user's eye or a portion thereof (e.g., the iris of an eye), the face of the user, etc.) to authenticate the user through the biometric authentication scheme. In some embodiments where an MR device includes a fingerprint scanner, the MR device may also authenticate a user through a fingerprint authentication scheme.

In some embodiments, an MR device or the authentication scheme may comprise a code block that detects and/or determines artifacts or noises such as eyelash occlusions, glasses occlusions, specular reflections, boundary artifacts of contact lenses, and/or less than optimal signal-to-noise ratio to filter out these artifacts or noises in authenticating a user. For example, a biometric authentication scheme may use masking bit vectors or masking bits (or bytes) to signify whether an iris or a part of the face of a user is obscured and/or use interpolation of adjacent bits or bytes around an occlusion to derive biometric data for the occlusion while assigning the same weight or a lower weight to the occlusion in authentication. In some embodiments, an MR device may employ a multi-tier authentication scheme that requires one or more private keys that are encrypted by, for example, fingerprint and/or iris recognition of a user.

Other authentication schemes such as single sign-on, authentication (e.g., single-factor authentication, multi-factor authentication, etc.) based on one or more authentication factors (e.g., knowledge factor(s) for something a user knows, ownership factor(s) for something that a user has such as a software or hardware token, inherent factor(s) for something a user is or does such as signature, biometric characteristics, voice, etc., or any other suitable factors), server-based authentication that includes transmission of authentication information such as key(s), certificate(s), etc. from a server, client-based authentication that uses information (e.g., key(s), credential(s), token(s), and/or certificate(s), etc.) locally stored within a non-volatile storage medium of a MR device, or any other authentication schemes.

MR devices may also employ one or more authentication schemes based on centralized authority-based trust relationships to provide secure network communication through known public certificate authorities in some embodiments. MR devices may also employ one or more other authentication schemes based on decentralized peer-based trust relationships (e.g., a web of trust or WoT) for services such as email or files where a trust relationship may be established by known individuals signing each other's cryptographic key at Key signing parties to provide other network communication in some of these embodiments. In addition or in the alternative, MR devices described herein may include a secure key storage device that may be used for authentication (e.g., network authentication, license management, etc.) where the MR devices may be authenticated through the use of wireless or wired connection to a computing system (e.g., a computing device on or through which the management software application in FIG. 1A resides) or a network (e.g., the domain of a company to which the MR devices belong).

The plurality of files or objects 120A may include a plurality of Web pages and resources 124B needed for proper display of the plurality of Web pages on computing systems of heterogeneous software applications or operating systems and/or on MR devices of one or more types (e.g., different models and/or versions of MR devices). The plurality of Web pages may include, for example, Web pages for authentication, authorization, and/or various management functions of MR devices.

In some embodiments where an MR device executes a remotely hosted software application (e.g., a cloud-based software application, a software provided as a service or SAAS, one or more microservices provided by a service-oriented architecture or SOA, etc.) that is provided to the MR device from a remote server, the MR device may include an API (application programming interface) 118B and/or a plug-in installed thereon to interface with the software application. In some embodiments, a plug-in comprises a software component that adds one or more features to an existing computer program such as a Web browser (e.g., a 2D Web browser, a 3D Web browser, a universe application or browser engine, etc.), a custom application installed on the MR device to invoke, interface with, and use the functionalities provided by the remotely provided software application to its fullest extent.

A plug-in may also be used when the MR device receives services or microservices from a remote host. For example, the plugin installed on an MR device may register with the remotely provided software application and a protocol for the exchange of data between remote host and the plugin so that the plugin may also interface with a services interface to use the services or microservices provided by the remote host. In some embodiments, the plugin operates independently of the remotely provided application so that a user or an administrator may add, update, or remove the plugin dynamically without needing to change the remotely provided software application.

In some embodiments, a plugin may be implemented for an MR device with one or more libraries that may be dynamically loaded at runtime and installed in a place prescribed by a remotely provided software application. In some embodiments where a plugin is integrated with a Web browser, the plugin is distinguishable from add-ons and extensions. More specifically, an add-on includes a software code that extends the function of the Web browser; an extension comprises a subtype; and a plugin may include a Web content renderer (e.g., a NPAPI (Netscape Plugin Application Programming Interface)-based web content renderer) that may be used to render, for example, application screens of a remotely provided software application.

The plurality of files or objects 120A may include a repository storing therein a plurality of profiles 108B. A profile may include multiple sections (e.g., general profile information or data, settings, connectivity, privacy settings, key information or data, etc.) and may be generated for a specific user or a specific group of users to control accessibility, functionality, and use of an MR device for the specific user or the specific group of users. More details about some example profiles are described below with reference to FIGS. 3A-3B.

The plurality of files or objects 120A may include one or more templates 110B. A template may be created with prescribed settings that may be customizable by a user having sufficient privileges or an administrator to create a profile. The plurality of files or objects 120A may include one or more sets of libraries 112B that may be statically or dynamically loaded for an MR device, its operating system and system software components, or one or more software applications therefor.

A library may comprise a collection of non-volatile resources used by computer programs for development and/or operations of these computer programs. Libraries 112B may include, for example and without limitation, configuration data, documentation, help data, message templates, pre-written code and subroutines, classes, values or type specifications, etc. in some embodiments A library may also include a collection of implementations of behavior, written in terms of a programming language, that has an interface by which the behavior is invoked so that programmers may use a library to make system calls instead of implementing these system calls over and over again. The behavior may also be reused by multiple independent software programs that invoke the library-provided behavior through a mechanism of the programming language. In the aforementioned example where an MR device includes a plug-in to invoke and exchange data with a remotely hosted software application (e.g., a productivity software application, a third-party provided software application, etc.), the necessary libraries may be dynamically loaded for the plug-in.

The plurality of files or objects 120A may include one or more software development kits (SDKs) 114B in some embodiments. A software development kit may include a collection of software development tools and may be used to facilitate the creation of software applications by having compiler, debugger, and/or a software framework specifically for the MR devices described herein. In some embodiments, the software development kits 114B may include one or more variants of Java Development Kit for Android applications on the Java platform, an iOS SDK for iOS applications, and/or a .NET Framework SDK to facilitate the execution of various management functions described herein for MR devices. In some embodiment, the software development kits 114B may optionally include additional code modules and features that may be installed in software applications to provide additional functions such as analytics, data about application activities, and/or monetization options. The plurality of files or objects 120A may include one or more firmware modules 116B or any low-level control for an MR device's hardware for the performance of control, monitoring, and/or data manipulation functions in some embodiments.

Figure 1C:
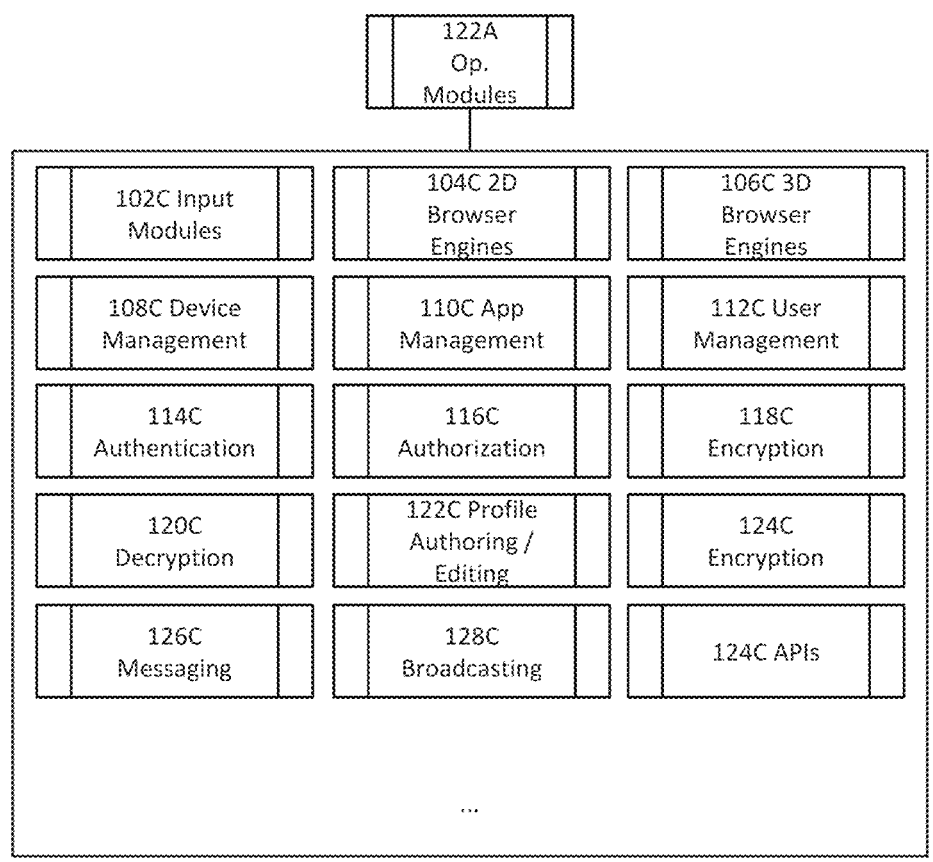
FIG. 1C illustrates another high-level block diagram of some example operation modules that may be employed in a system illustrated in FIG. 1A for management of mixed reality systems or devices in one or more embodiments.

FIG. 1C illustrates another high-level block diagram of some example operation modules that may be employed in a system illustrated in FIG. 1A for management of mixed reality systems or devices in one or more embodiments. More particularly, FIG. 1C illustrates some example operation modules 122A that may be provided to an MR device to perform their respective functions when executed. For example, the example operation modules 122A may include one or more input modules 102C that may provide a simulated or emulated software input device or interface (e.g., a virtual keyboard, a user interface for providing textual, voice, and/or image/video inputs, etc.) The example operation modules 122A may include one or more 2D (two-dimensional) browser engines (which may also be termed as a layout engine or a rendering engine) 104C that transforms Web documents (e.g., HTML documents) and one or more other resources of a 2D Web page into an interactive visual representation on or with an MR device. The example operation modules 122A may include one or more 3D browser engines 106C that transforms Web documents and one or more other resources of a 2D or 3D Web page into a 3D (three-dimensional) interactive visual representation in a prism provided by an MR device.

The example operation modules 122A may include a device management module 108C to facilitate various device management functions for an MR device and an application management module 110C to facilitate various management functions for software applications for an MR device. In some embodiments, the example operation modules 122A may include a user management module 112C that allows a user or an administrator to manage the user of an MR device or a group of users of respective MR devices. The example operation modules 122A may further include one or more authentication modules 114C that may be invoked to authenticate a user and one or more authorization modules 116C that may be invoked to specify access rights and/or privileges to resources related to data security and device security pertaining to MR devices for a user or a group of users. In some embodiments, an authorization module 116C may operate based at least in part upon a set of rules (e.g., a set of control rules) included in or associated with one or more profiles to decide or define whether access requests from a user or a group of users shall be granted or rejected.

The example operation modules 122A may include one or more encryption modules 118C and one or more decryption modules 120C that may be invoked on an MR device to encrypt data, communications, etc., to decrypt encrypted data, encrypted communications, etc. and/or to function in connection with, for example, an authentication module (and/or an authorization module) for authentication (and/or for authorization) of a user. The example operation modules 122A may include one or more profile authoring or editing modules 122C that may be invoked to provide an interface and functionality for a user or an administrator to create or modify a profile.

In addition or in the alternative, the example operation modules 122A may include a messaging or notification module 126C which, when invoked, may send various types of messages or calls to one or more software components (e.g., inter-process calls) or users. The example operation modules 122A may further optionally include a broadcasting module 128C that may broadcast messages and/or data to one or more software components, users, and/or other MR devices. For example, an MR device may broadcast performance or operation metrics monitored and gathered by the MR device to one or more other MR devices, computers, or other computing devices for analytics purposes. An MR device may also invoke a broadcasting module 128C or a messaging or notification module 126C to send messages or other types of notices to a group of MR devices. For example, an MR device may broadcast an encrypted or unencrypted message to all MR devices within a range (e.g., on the same network, within a physical distance, etc.) or to predetermined MR devices (e.g., MR devices whose users are in the same group as the user of the broadcasting MR device, etc.)

Figure 1D:
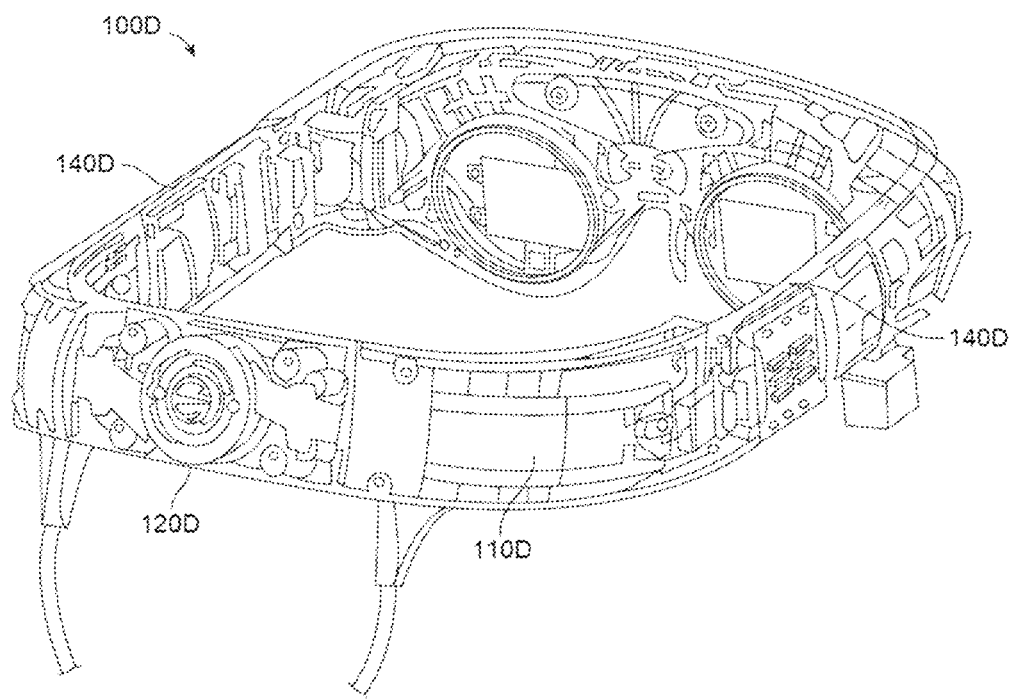
FIG. 1D illustrates an example mixed reality headset of an example mixed reality system or device that may be a subject for various techniques described herein for management of mixed reality systems or devices in one or more embodiments.

FIG. 1D illustrates an example of a mixed-reality headset according to some embodiments of the invention. Headset 100D includes AR/VR/MR/XR components that are attached to a frame 140D. The headset 100D may comprise one or more compliant arms, one or more rigid arms, or a combination of at least one compliant arm and at least one rigid arm. In some embodiments, one or more compliant arms 110D may be attached to frame 140D such that the compliant arms 110D (depicted as being within the frame of the headset) wrap around an entire circumference of the head of a user. The one or more compliant arms 110D may be joined together by a connector 120D. The connector 120D may include, for example, a spool type spring that provides a compression force to join the compliant arms, wherein the spool type spring provides a compression force that joins the compliant arms together for fitting adjustments to accommodate different head sizes instead of a compression force for constricting the compliant arms and headset to a user's head.

Connector 120D may maintain a continuous force via the spool type spring so that the user does not have to manually adjust the compliant arms or the connector 120D once the headset 100DD is adjusted to fit the user's head. For example, a user may adjust a circumference of the wrap around configuration (e.g., expand) of headset 100D by separating the compliant arms 110D such that the spool type spring of connector 120D may maintain a compression force to hold the compliant arms 110D in a shape that provides an appropriate circumference to maintain a comfortable fit for different sized heads. Headset 100D may rest on the parietal bone located just above the occipital bone of a user to prevent interference with the user's ears while maintaining a counterweight to the front viewing optics assembly. Headset 100D may prevent the frame 140D having the front viewing optics assembly from slipping down the nose bridge by transferring the weight of the headset 100D from a user's nose bridge to other areas of a user's head (e.g., parietal bone/crown, occipital bone, and forehead).

Figure 1E:
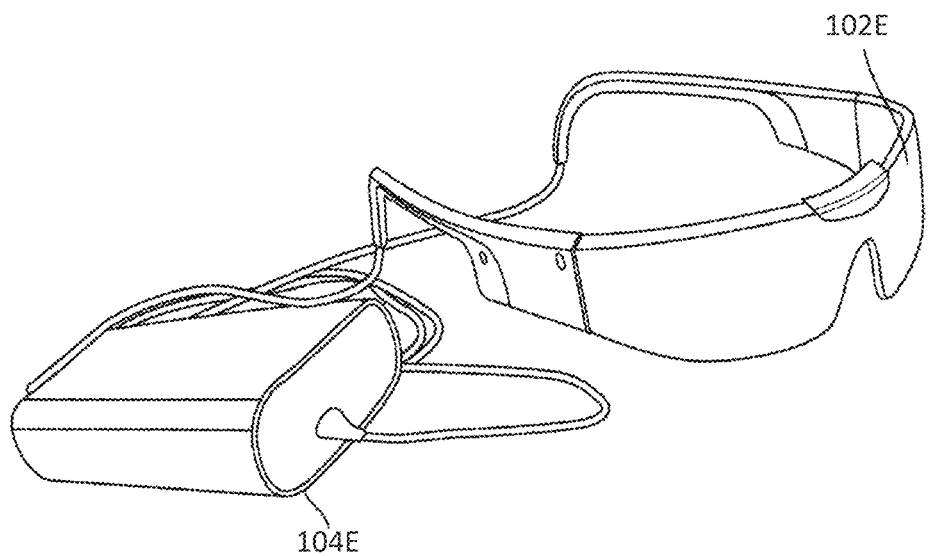
FIG. 1E illustrates an example mixed reality system or device that may be a subject for various techniques described herein for management of mixed reality systems or devices in one or more embodiments.

FIG. 1E illustrates a simplified example of a wearable XR device with a belt pack external to the MR glasses in some embodiments. More specifically, FIG. 1E illustrates a simplified example of a user-wearable VR/AR/MR/XR system that includes an optical sub-system 102E and a processing sub-system 104E and may include multiple instances of personal augmented reality systems, for example a respective personal augmented reality system for a user. Any of the neural networks described herein may be embedded in whole or in part in or on the wearable MR device. For example, some or all of a neural network described herein as well as other peripherals (e.g., ToF or time-of-flight sensors) may be embedded on the processing sub-system 104E alone, the optical sub-system 102E alone, or distributed between the processing sub-system 104E and the optical sub-system 102E.

Some embodiments of the VR/AR/MR/XR system may comprise optical sub-system 102E that deliver virtual content to the user's eyes as well as processing sub-system 104E that perform a multitude of processing tasks to present the relevant virtual content to a user. The processing sub-system 104E may, for example, take the form of the belt pack, which can be convenience coupled to a belt or belt line of pants during use. Alternatively, the processing sub-system 104E may, for example, take the form of a personal digital assistant or smartphone type device.

The processing sub-system 104E may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The processing sub-system 104E may include one or more non-transitory computer- or processor-readable media, for example volatile and/or nonvolatile memory, for instance read only memory (ROM), random access memory (RAM), static RAM, dynamic RAM, Flash memory, EEPROM, etc.

The processing sub-system 104E may be communicatively coupled to the head worn component. For example, the processing sub-system 104E may be communicatively tethered to the head worn component via one or more wires or optical fibers via a cable with appropriate connectors. The processing sub-system 102E and the optical sub-system 104E may communicate according to any of a variety of tethered protocols, for example UBS®, USB2®, USB3®, USB-C®, Ethernet®, Thunderbolt®, Lightning® protocols.

Alternatively or additionally, the processing sub-system 104E may be wirelessly communicatively coupled to the head worn component. For example, the processing sub-system 104E and the optical sub-system 102E may each include a transmitter, receiver or transceiver (collectively radio) and associated antenna to establish wireless communications there between. The radio and antenna(s) may take a variety of forms. For example, the radio may be capable of short-range communications, and may employ a communications protocol such as BLUETOOTH®, WI-FI®, or some IEEE 802.11 compliant protocol (e.g., IEEE 802.11n, IEEE 802.11a/c). Various other details of the processing sub-system and the optical sub-system are described in U.S. patent application Ser. No. 14/707,000 filed on May 8, 2015 and entitled "EYE TRACKING SYSTEMS AND METHOD FOR AUGMENTED OR VIRTUAL REALITY", the content of which is hereby expressly incorporated by reference in its entirety for all purposes.

Figure 1F:
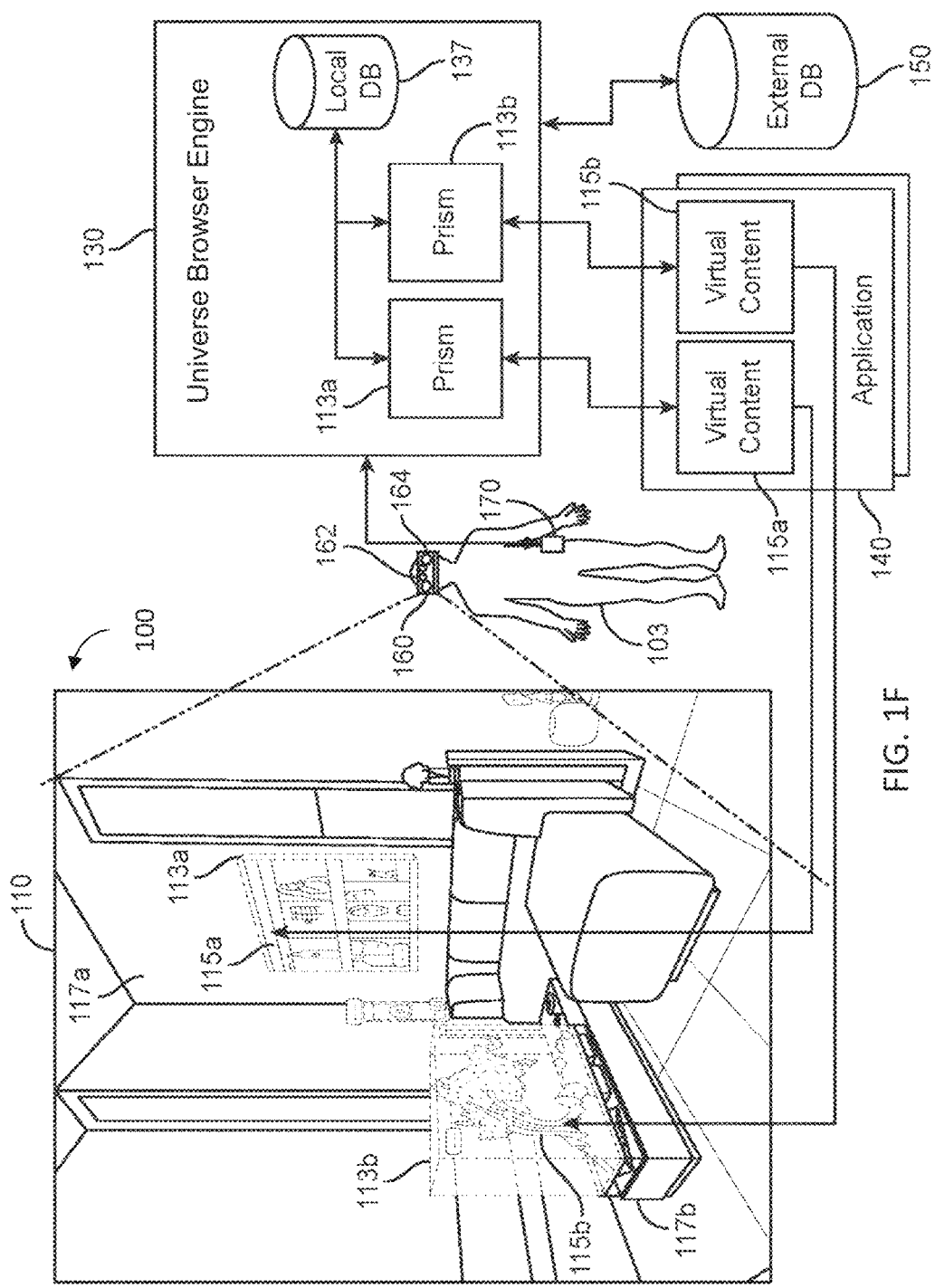
FIG. 1F illustrates an example user physical environment and system architecture for managing and displaying productivity applications and/or resources in a three-dimensional virtual space with a mixed reality system or device in one or more embodiments.

FIG. 1F illustrates an example user physical environment and system architecture for managing and displaying productivity applications and/or resources in a three-dimensional virtual space with a mixed reality system or device in one or more embodiments. More specifically, FIG. 1F illustrates an example user physical environment and system architecture for managing and displaying web pages and web resources in a virtual 3D space with a mixed reality system in one or more embodiments. The representative environment 100 includes a user's landscape 110 as viewed by a user 103 through a head-mounted system 160. The user's landscape 110 is a 3D view of the world where user-placed content may be composited on top of the real world. The representative environment 100 further includes accessing a universe application or universe browser engine 130 via a processor 170 operatively coupled to a network (not shown).

Although the processor 170 is shown as an isolated component separate from the head-mounted system 160, in an alternate embodiment, the processor 170 may be integrated with one or more components of the head-mounted system 160, and/or may be integrated into other system components within the representative environment 100 such as, for example, a network to access a computing network (not shown) and external storage device(s) 150. In some embodiments, the processor 170 may not be connected to a network. The processor 170 may be configured with software (e.g., a universe application or universe browser engine 130) for receiving and processing information such as video, audio, and/or other data (e.g., depth camera data) received from the head-mounted system 160, a local storage device 137, application(s) 140, a computing network, and/or external storage device(s) 150.

The universe application or universe browser engine 130 may be a 3D windows manager that is analogous to a 2D windows manager running on, for example, a desktop computer for managing 2D windows displayed on the display screen of the desktop computer. However, the universe application or universe browser engine 130 (hereinafter may be referred to as "the Universe" for simplicity) manages the creation, placement and display of virtual content 115 in a 3D spatial environment, as well as interactions between a plurality of virtual content 115 displayed in a user's landscape 110. Virtual content 115 from applications 140 are presented to users 103 inside of one or more 3D window display management units such as bounded volumes and/or 3D windows, hereinafter may be referred to as Prisms 113.

A bounded volume/3D window/Prism 113 may be a rectangular, cubic, cylindrical, or any other shape volume of space that may be positioned and oriented in space. A Prism 113 may be a volumetric display space having boundaries for content (e.g., virtual content) to be rendered/displayed into, wherein the boundaries are not displayed. In some embodiments, the boundaries may be displayed. The Prism 113 may present a standard base level of interaction and control over an application's content and its placement. The Prism 113 may represent a sub-tree of a multi-application scene graph, which may be embedded inside of the universe browser engine 130, or may be external to but accessed by the universe browser engine. A scene graph is a general data structure commonly used by vector-based graphics, editing applications and modern gaming software, which arranges the logical and often (but not necessarily) spatial representation of a graphical scene. A scene graph may be considered a data-structure that defines how content is positioned and transformed relative to each other within its structure. Application(s) 140 are given instances of Prisms 113 to place content within. Applications may render 2D/3D content within a Prism 113 using relative placement algorithms and arbitrary transforms, but the universe browser engine (130) may still ultimately be in charge of gross interaction patterns such as content extraction. Multiple applications may render to the universe browser engine (130) via the Prisms 113, with process boundaries separating the Prisms 113. There may be n number of bounded volumes/Prisms 113 per application process, but this is explicitly an n:1 relationship such that only one process for each application may be running for each bounded volume/Prism 113, but there may be a number of m processes running, each with their own bounded volume/Prism 113.

The universe browser engine (130) operates using a Prism/distributed scene graph approach for 2D and/or 3D content. A portion of the universe browser engine's scene graph is reserved for each application to render to. Each interaction with an application, for example the launcher menu, the landscape, or body-centric application zones (all described in more detail below) may be done through a multi-application scene graph. Each application may be allocated 1 to "n" rectangular Prisms that represent a sub-tree of the scene graph. Prisms are not allocated by the client-side applications, but instead are created through the interaction of the user inside of the universe browser engine (130), for example when the user opens a new application in the landscape by clicking a button on a controller. In some embodiments, an application can request a Prism from the universe browser engine (130), but the request may be denied. In some embodiments, if an application requests and is allowed a new Prism, the application may only transform the new Prism relative to one of its other Prisms.

The universe browser engine (130) comprises virtual content 115 from application(s) 140 in objects called Prisms 113. Each application process or instance may render its virtual content into its own individual Prism 113 or set of Prisms. The universe browser engine (130) manages a world space, sometimes called a landscape, where Prisms 113 are displayed. In some embodiments, the universe browser engine (130) provides the ability to attach applications to walls and surfaces, place Prisms at an arbitrary location in space, register them with the mixed reality system's world database, and/or control sharing of content between multiple users of the mixed reality system.

In some embodiments, the purpose of the Prisms 113 is to provide behaviors and control over the rendering and display of the content. Much like a 2D display, where a window may be used to define location, menu structures, and display of 2D content within a 2D window, with 3D virtual display, the Prism allows the mixed reality system (e.g., the universe browser engine (130)) to wrap control relating to, for example, content locations, 3D window behavior, and/or menu structures around the display of 3D content. For example, controls may include at least placing the virtual content in a particular location in the user's landscape 110, removing the virtual content from the landscape 110, copying the virtual content and/or placing the copy in a different location, etc. In some embodiments, Prisms may be created and destroyed by the user and only the user. This may be done explicitly to help control abuse of the interfaces provided and to help the user maintain control of the user's content.

Additionally, in some embodiments, application(s) 140 do not know where their volumes are placed in the landscape—only that they exist. In some embodiments, applications may request one or more Prisms, and the request may or may not be granted. After the new Prism is created, the user may change the position, and/or the application may automatically position the new Prism relative to a currently existing Prism associated with the application. In some embodiments, each application 140 making use of the universe browser engine's service to render 3D content (e.g. composited 3D content) into the universe browser engine process may be required to first register a listener with the universe browser engine. This listener may be used to inform the application 140 of creation and destruction of rendering Prisms, based upon user movement and user interaction with those Prisms. A listener is an interface object that receives messages from an inter-process communication system. For example, in the Android operating system, a listener is an object that receives messages through an Android Binder interface. However, any IPC system may be used such that a Binder is not always used.

In some embodiments, Prisms may be created from the following example interactions: (1) The user has extracted content from an extractable node (disclosed further below); (2) The user has started an application from the launcher; (3) The user has downloaded a nearby passable world map tile that includes a placed instance of an application that the user has permission to see; (4) The user has downloaded a nearby passable world map tile that includes an object that the passable world object recognizer infrastructure has detected, that a given application must render content for; and/or (5) The user has triggered a dispatch from another application that must be handled in a different application. In some embodiments, a passable world model allows a user to effectively pass over a piece of the user's world (e.g., ambient surroundings, interactions, etc.) to another user.

Extractable Content is content inside a Prism (including but not limited to an icon, 3D icon, word in a text display, and/or image) that can be pulled out of the Prism using an input device and placed in the landscape. For example, a Prism might display a web page showing a running shoe for sale. To extract the running shoe, the shoe can be selected and "pulled" with an input device. A new Prism would be created with a 3D model representing the shoe, and that Prism would move out of the original Prism and towards the user. Like any other Prism, the user may use an input device to move, grow, shrink or rotate the new Prism containing the shoe in the 3D space of the landscape. An Extractable Node is a node in the Prism's scene graph that has been tagged as something that can be extracted. In the universe browser engine, to extract content means to select an extractable node, and use an input device to pull the content out of the Prism. The input to initiate this pull could be aiming a 6d of pointing device at extractable content and pulling the trigger on the input device.

Each user's respective individual mixed reality system (e.g., mixed reality devices) captures information as the user passes through or inhabits an environment, which the mixed reality system processes to produce a passable world model. More details regarding a passable world are described in U.S. patent application Ser. No. 14/205,126, filed on Mar. 11, 2014, entitled "SYSTEM AND METHOD FOR AUGMENTED AND VIRTUAL REALITY", which is hereby explicitly incorporated by reference for all purposes. The individual mixed reality system may communicate or pass the passable world model to a common or shared collection of data, referred to as the cloud. The individual mixed reality system may communicate or pass the passable world model to other users, either directly or via the cloud. The passable world model provides the ability to efficiently communicate or pass information that essentially encompasses at least a field of view of a user. In one embodiment, the system uses the pose and orientation information, as well as collected 3D points described above in order to create the passable world.

In some embodiments, the passable world model allows the user the ability to integrate content (e.g., virtual and/or physical content) with the real world. A passable world system may include one or more mixed reality systems or mixed reality user devices that are able to connect to a cloud network, a passable world model, a set of object recognizers, and a database (e.g., external database 150). The passable world model may be configured to receive information from the mixed reality user devices and also transmit data to them through the network. For example, based on the input from a user, a piece of the passable world may be passed on from one user to another user. The passable world model may be thought of as a collection of images, points and other information (e.g., real-world information) based on which the mixed reality system is able to construct, update and build the virtual world on the cloud, and effectively pass pieces of the virtual world to various users. For example, a set of real-world points collected from a mixed reality user device may be collected in the passable world model. Various object recognizers may crawl through the passable world model to recognize objects, tag images, etc., and attach semantic information to the objects. The passable world model may use the database to build its knowledge of the world, attach semantic information, and store data associated with the passable world.

In the case of a Prism that is visible to the user but whose controlling application is not currently installed, the universe browser engine may render a temporary placeholder for that application that, when interacted with, redirects the user to the application store page for that application. In some embodiments, Prisms may be destroyed in similar interactions: (1) The user has walked far enough from a passable world map tile that the placed instance of an application has been unloaded (i.e. removed) from volatile memory; (2) The user has destroyed a placed instance of an application; and/or (3) An application has requested that a Prism be closed.

In some embodiments, if no Prisms for an application are visible and/or loaded, then the process associated with those Prisms may be paused or ended. Once a placed Prism for that application is visible again, the process may be restarted. Prisms may also be hidden, but, in some embodiments, this may only happen at the behest of the universe browser engine and the user. In some embodiments, multiple Prisms may be placed at the same exact location. In such embodiments, the universe browser engine may only show one instance of a placed Prism in one place at a time, and manage the rendering by hiding the visibility of a Prism (and its associated content) until a user interaction is detected, such as the user "swipes" to the next visible element (e.g., Prism) in that location.

In some embodiments, each Prism 113 may be exposed to the application 140 via a volume listener interface with methods for accessing properties of the Prism 113 and registering content in a scene graph sub-tree for shared resources such as meshes, textures, animations, and so on. In some embodiments, since the application 140 does not know where a given Prism 113 is placed in 3D space, the volume listener interface may provide accessor methods to a set of hints that help to define where the given Prism is present in the universe browser engine, for example hand centric, stuck in the landscape, Body Centric, etc. These properties additionally specify expected behavior of the Prisms, and may be controlled in a limited fashion either by the user, the application 140, or the universe browser engine. A given Prism can be positioned relative to another Prism that an application owns. Applications can specify that Prisms should snap together (two sides of their bounding volumes touch) while Prisms from that application are being placed. Additionally, Prisms may provide an API (e.g., 118B) for key-value data storage. Some of these key-value pairs are only writable by privileged applications.

In some embodiments, application(s) 140 are client software applications that provide content that is to be displayed to the user 103 in the user's landscape 110. For example, an application 140 may be a video streaming application, wherein video data may be streamed to the user to be displayed on a 2D planar surface. As another example, an application 140 may be a Halcyon application that provides 3D imaging of physical objects that may denote a period of time in the past that was idyllically happy and peaceful for the user. Application 140 provides the content that a user may want to include in the user's landscape 110. The universe browser engine via the Prisms 113 manages the placement and management of the content that is generated by application 140.

When a non-immersive application is executed/launched in the user's landscape 110, its content (e.g., virtual content) is rendered inside of a Prism 113. A non-immersive application may be an application that is able to run and/or display content simultaneously with one or more other applications in a shared 3D environment. Although the virtual content may be contained within the Prism, a user may still interact with the virtual content, such as, for example, hovering over an object, clicking on it, etc. The Prism 113 may also bound application 140's displayed content so different applications 140 do not interfere with each other or other objects in the user's landscape 110. Prisms 113 may also provide a useful abstraction for suspending, pausing, and/or minimizing virtual content from application(s) 140 that are out of view or too far away from the user.

The Prisms 113 may be anchored/attached/pinned to various objects within a user's landscape 110, including snapping or anchoring to another Prism. For example, Prism 113*a*, which displays virtual content 115 (e.g., a video 115*a* from a video streaming application), may be anchored to a vertical wall 117*a*. As another example, Prism 113*b*, which displays a 3D tree 115*b* from a Halcyon application, is shown in FIG. 1 to be anchored to a table 117*b*. Furthermore, a Prism 113 may be anchored relative to a user 103 (e.g., body-centric), wherein the Prism 113 which displays virtual content 115 may be anchored to a user's body, such that as the user's body moves, the Prism 113 moves relative to the movement of the user's body. A body-centric content may be application content such as planes, meshes, etc. that follow the user and remain positionally consistent with the user. For example, a small dialog box that follows the user around but exists relative to the user's spine rather than the landscape 110. Additionally, a Prism 113 may also be anchored to a virtual object such as a virtual display monitor displayed within the user's landscape 110. The Prism 113 may be anchored in different ways, which is disclosed below.

The universe browser engine may include a local database 137 to store properties and characteristics of the Prisms 113 for the user. The stored Prism information may include Prisms activated by the user within the user's landscape 110. Local database 137 may be operatively coupled to an external database 150 that may reside in the cloud or in an external storage facility. External database 150 may be a persisted database that maintains information about the mixed reality environment of the user and of other users.

For example, as a user launches a new application to display virtual content in the user's physical environment, the local database 137 may store information corresponding to a Prism that is created and placed at a particular location by the universe browser engine, wherein an application 140 may render content into the Prism 113 to be displayed in the user's landscape 110. The information corresponding to the Prism 113, virtual content 115, and application 140 stored in the local database 137 may be synchronized to the external database 150 for persistent storage.

In some embodiments, the persisted storage may be important because when the mixed reality system is turned off, data stored in the local database 137 may be erased, deleted, or non-persisted. Thus, when a user turns on the mixed reality system, the universe browser engine may synchronize with the external database 150 to retrieve an instance of the local database 137 corresponding to the user 103 and the user's landscape 110 prior to the mixed reality system being turned off. The local database 137 may be an instance of the external database 150, wherein the instance of the local database 137 includes information pertinent to the user 103 and the user's current environment. The external database 150 may additionally store instances of local databases of other users, multiple users, the same user over time, and/or other environments. The external database 150 may contain information that is used to manage and share virtual content between multiple users of the mixed reality system, whereas the local database 137 stores and maintains information corresponding to the user 103.

The universe browser engine may create a Prism 113 for application 140 each time application(s) 140 needs to render virtual content 115 onto a user's landscape 110. In some embodiments, the Prism 113 created by the universe browser engine allows application 140 to focus on rendering virtual content for display while the universe browser engine focuses on creating and managing the placement and display of the Prism 113 having the virtual content 115 displayed within the boundaries of the Prism by the application 140.

Each virtual content 115 rendered by an application 140, displayed in the user's landscape 110, may be displayed within a single Prism 113. For example, if an application 140 needs to render two virtual contents (e.g., 115*a* and 115*b*) to be displayed within a user's landscape 110, then application 140 may render the two virtual contents 115*a* and 115*b*. Since virtual contents 115 include only the rendered virtual contents, the universe browser engine may create Prisms 113*a* and 113*b* to correspond with each of the virtual content 115*a* and 115*b*, respectively. The Prism 113 may include 3D windows management properties and characteristics of the virtual content 115 to allow the universe browser engine to manage the virtual content 115 inside the Prism 113 and the placement and display of the Prism 113 in the user's landscape 110.

The universe browser engine may be the first application a user 103 sees when the user 103 turns on the mixed reality device. The universe browser engine may be responsible for at least (1) rendering the user's world landscape; (2) 2D window management of planar applications and 3D windows (e.g., Prisms) management; (3) displaying and executing the application launcher menu; (4) allowing the user to place virtual content into the user's landscape 110; and/or (5) managing the different states of the display of the Prisms 113 within the user's landscape 110.

The head-mounted system 160 may be a mixed reality head-mounted system that includes a display system (e.g., a user interface) positioned in front of the eyes of the user 103, a speaker coupled to the head-mounted system and positioned adjacent the ear canal of the user, a user-sensing system, an environment sensing system, and a processor (all not shown). The head-mounted system 160 presents to the user 103 the display system (e.g., user interface) for interacting with and experiencing a digital world. Such interaction may involve the user and the digital world, one or more other users interfacing the representative environment 100, and objects within the digital and physical world.

The user interface may include viewing, selecting, positioning and managing virtual content via user input through the user interface. The user interface may be at least one or a combination of a haptics interface devices, a keyboard, a mouse, a joystick, a motion capture controller, an optical tracking device, an audio input device, a smartphone, a tablet, or the head-mounted system 160. A haptics interface device is a device that allows a human to interact with a computer through bodily sensations and movements. Haptics refers to a type of human-computer interaction technology that encompasses tactile feedback or other bodily sensations to perform actions or processes on a computing device.

An example of a haptics controller may be a totem (not shown). In some embodiments, a totem is a hand-held controller that tracks its position and orientation relative to the headset 160. In this example, the totem may be a six degree-of-freedom (six DOF) controller where a user may move a Prism around in altitude and azimuth (on a spherical shell) by moving the totem up or down. In some embodiments, to move the object closer or farther away, the user may use the joystick on the totem to "push" or "pull" the Prism, or may simply move the totem forward or backward. This may have the effect of changing the radius of the shell. In some embodiments, two buttons on the totem may cause the Prism to grow or shrink. In some embodiments, rotating the totem itself may rotate the Prism. Other totem manipulations and configurations may be used, and should not be limited to the embodiments described above.

The user-sensing system may include one or more sensors 162 operable to detect certain features, characteristics, or information related to the user 103 wearing the head-mounted system 160. For example, in some embodiments, the sensors 162 may include a camera or optical detection/scanning circuitry capable of detecting real-time optical characteristics/measurements of the user 103 such as, for example, one or more of the following: pupil constriction/dilation, angular measurement/positioning of each pupil, sphericity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's landscape 110. Objects or information detected by the sensors 164 may be provided as input to the head-mounted system 160. In some embodiments, this input may represent user interaction with the virtual world. For example, a user (e.g., the user 103) viewing a virtual keyboard on a desk (e.g., the table 188) may gesture with their fingers as if the user were typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for capturing and interpreting scene information, for example, through continuously and/or intermittently projected infrared structured light. The environment-sensing system may be used for mapping one or more elements of the user's landscape 110 around the user 103 by detecting and registering one or more elements from the local environment, including static objects, dynamic objects, people, gestures and various lighting, atmospheric and acoustic conditions, etc. Thus, in some embodiments, the environment-sensing system may include image-based 3D reconstruction software embedded in a local computing system (e.g., the processor 170) and operable to digitally reconstruct one or more objects or information detected by the sensors 164.

In some embodiments, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS (Complementary metal-oxide-semiconductor) sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of the system of the representative environment 100, or may be an isolated device (wearable or separate from the user 103) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., a computing network, and the user-sensing system and the environment-sensing system from the head-mounted system 160) into image and audio data, wherein the images/video and audio may be presented to the user 103 via the user interface (not shown).

The processor 170 handles data processing for the various components of the head-mounted system 160 as well as data exchange between the head-mounted system 160 and the software applications such as the universe browser engine, the external database 150, etc. For example, the processor 170 may be used to buffer and process data streaming between the user 103 and the computing network, including the software applications, thereby enabling a smooth, continuous and high-fidelity user experience. The processor 170 may be configured to execute a set of program code instructions. The processor 170 may include a memory to hold the set of program code instructions, in which the set of program code instructions comprises program code to display virtual content within a subset of available 3D displayable space by displaying the virtual content within a volumetric display space, wherein boundaries of the volumetric display space are not displayed. In some embodiments, the processor may be two or more processors operatively coupled.

In some embodiments, the mixed reality system may be configured to assign to a Prism universal features and application selected/application-specific features from a list of pre-approved options for configurations of display customizations by an application. For example, universal features ensure different applications interact well together. Some example of universal features may include max/min size, no overlapping Prisms (excluding temporary overlap from collision behavior), no displaying content outside the boundaries of the Prism, applications need permission from user if the application wants to access sensors or sensitive information. Application selected/application-specific features enable optimized application experiences.

Application-selected/application-specific features may include max/min size (within limits from the system), default size (within limits from the system), type of body dynamic (e.g., none/world lock, billboard, edge billboard, follow/lazy headlock, follow based on external sensor, fade—discussed below), child Prism spawn location, child head pose highlight, child Prism relational behavior, on surface behavior, independent transformation control, resize vs. scale, idle state timeout, collision behavior, permission/password to access application, etc. In another embodiment, the mixed reality system may be configured to display virtual content into one or more Prisms, wherein the one or more Prisms do not overlap with one another, in some embodiments.

In some embodiments, one or more Prisms may overlap in order to provide specific interactions. In some embodiments, one or more Prisms may overlap, but only with other Prisms from the same application. In another embodiment, the mixed reality system may be configured to change a state of a Prism based at least in part on a relative position and location of the Prism to a user. In another embodiment, the mixed reality system may be configured to manage content creation in an application and manage content display in a separate application. In another embodiment, the mixed reality system may be configured to open an application that will provide content into a Prism while simultaneously placing the Prism in a mixed reality environment.

In some embodiments, the mixed reality system may be configured to assign location, orientation, and extent data to a Prism for displaying virtual content within the Prism, where the virtual content is 3D virtual content. In some embodiments, the mixed reality system may be configured to pin a launcher application to a real-world object within a mixed reality environment. In some embodiments, the mixed reality system may be configured to assign a behavior type to each Prism, the behavior type comprising at least one of a world lock, a billboard, an edge billboard, a follow headlock, a follow based on external sensor, or a fade (described below in more detail). In some embodiments, the mixed reality system may be configured to identify a most used content or an application that is specific to a placed location of a launcher application, and consequently re-order to the applications from most to least frequently used, for example. In another embodiment, the mixed reality system may be configured to display favorite applications at a placed launcher application, the favorite applications based at least in part on context relative to a location of the placed launcher.

Figure 1G:
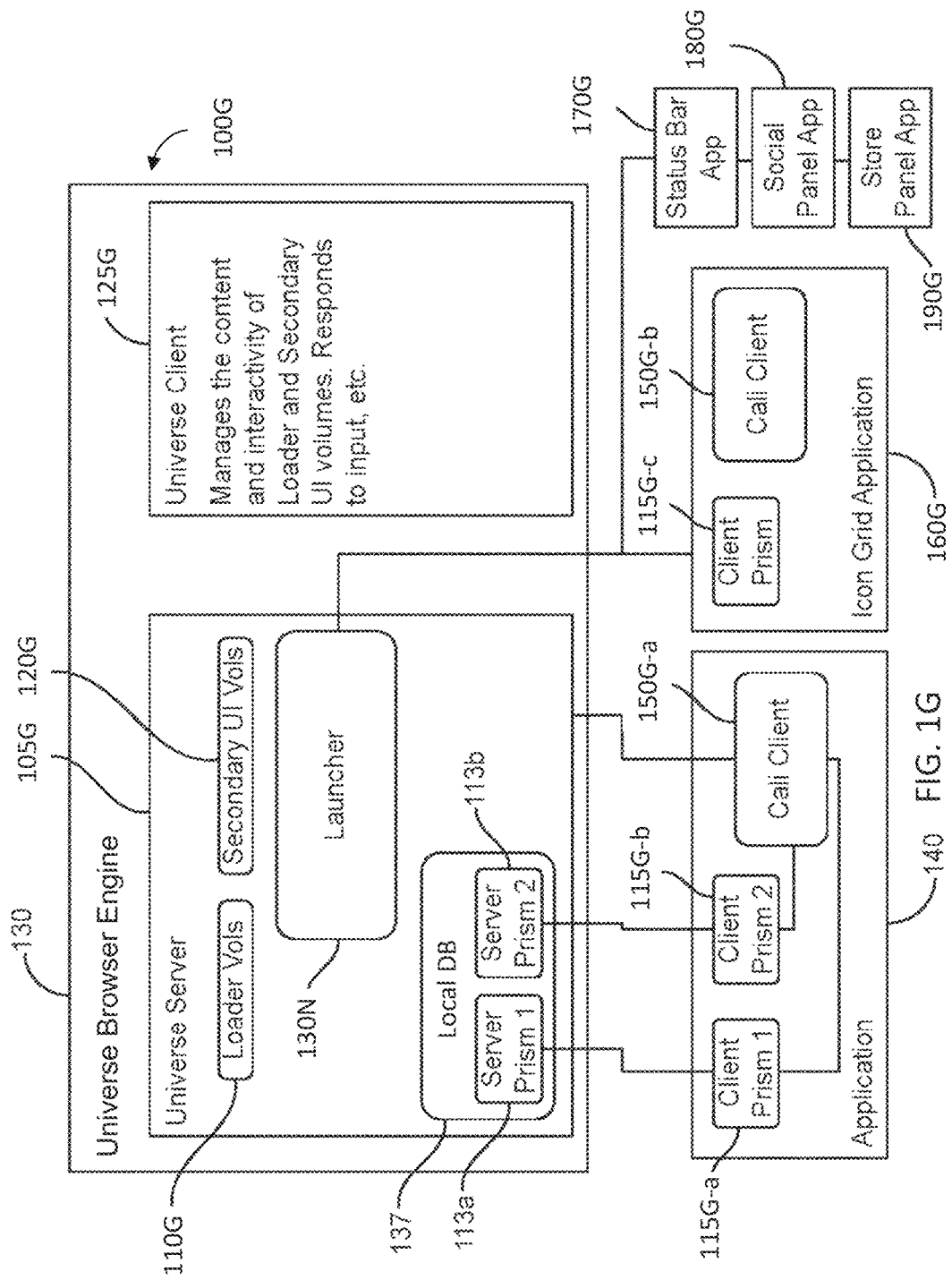
FIG. 1G illustrates a system architecture for managing and displaying web pages and web resources in a three-dimensional virtual space with a mixed reality system in one or more embodiments.

FIG. 1G illustrates a system architecture for managing and displaying web pages and web resources in a three-dimensional virtual space with a mixed reality system in one or more embodiments. System 100G includes a Universe or a universe browser engine 130, application 140, icon grid application 160G, status bar app 170G, social panel app 180G, store panel app 190G, a locally installed or remotely provisioned management software application described herein, and/or a collection of one or more productivity software applications (e.g., word processor, spreadsheet software, presentation software, etc.) that may be locally installed on an MR device or remotely provisioned through, for example, one or more cloud-based platform. In some embodiments, the locally installed or remotely provisioned management software application may be identical to that of the management software application residing on a server and include all the functionalities. In some of these embodiments, the active functionalities of a locally installed or remotely provisioned management software application may be subject to the authentication and/or authorization results so that different users having different privileges and/or rights may be allowed to access the corresponding sets of functionalities of the management software application. These applications may represent the base level of applications on system 100G, however, in some embodiments, more or fewer applications may be part of system 100G.

As discussed in FIG. 1F above, the universe browser engine may be thought of as a 3D windows (e.g., Prisms) manager, analogous to a 2D windows manager that manages 2D windows in conventional computer desktop systems and such. FIG. 1G may provide further details of the universe browser engine from FIG. 1F. Here, the universe browser engine 130 may also include a universe server 105G, loader volumes 110G, secondary UI volumes 120G, universe client 125G, launcher application 130, and universe server 105G. The Universe server 105G may be a processing thread of the universe browser engine in a multi-threaded processing environment for multi-parallel processing.

Loader volumes 110G are placeholder volumes that are displayed to a user while the universe browser engine is creating a Prism for displaying virtual content in the user's landscape 110. For example, when a user selects an application to display in the user's landscape 110 at a particular location, for example, on a vertical wall of the user's landscape 110, while the universe browser engine is setting up the Prism and starting the application for rendering the virtual content into the Prism, the universe browser engine may display a loader volume 110G with a default icon as a placeholder volume to indicate to the user that the universe browser engine is setting up the Prism for display. Once the application finishes rendering the virtual content into the Prism for display in the user's landscape, the loader volume 110G is replaced with the actual Prism containing the rendered virtual content.

In some embodiments, while the universe browser engine is starting up an application for displaying virtual content, the user 103 may move the loader volume 110G to a desired different location. In some embodiments, the user may move the loader volume 110G to a location that is different than the location of the loader volume/Prism that was initially selected. Once the universe browser engine is done creating the Prism and the application has rendered the virtual content into the Prism, the universe browser engine may replace the loader volume 110G, wherever the user may have placed the loader volume 110G, with the Prism displaying the virtual content.

Secondary UI volume 120G is another Prism that may be created when a Prism (e.g., its "parent Prism") is created. The Secondary UI volume 120G provides a universal interface of Prisms for users. For example, the Secondary UI volume 120G may be considered as window dressing because the Secondary UI volume 120G provides a mechanism to manage a Prism (e.g., close/remove, share, follow, take a screenshot of the Prism's content, etc.). When a Prism is created, a Secondary UI volume 120G may be created for the Prism if the Prism is not part of the Launcher (Launcher applications may not have Secondary UI volumes). The Secondary UI volume 120G provides the space/volume to display graphical user interface icons such as close/remove, share, follow, screenshot, etc. for the user to interact with and manage the Prism. The Secondary UI volume 120G is associated to the parent Prism and may be grouped with the parent Prism. The Secondary UI volume 120G lifetime ends when the parent Prism lifetime it is associated with ends.

In some embodiments, the Secondary UI volume 120G may have at least three states: (1) Display nothing when the parent Prism is out of focus; (2) Display the component's "visible name" when the parent Prism is in focus; and (3) Display a "carousel" of application menu option icons when a specific user interaction is detected, for example, a home button of a handheld controller (e.g., a Totem, or other suitable user interaction controllers) has been held for a certain number of seconds, wherein the carousel displays a collection of icons, one of which may be a large "X" icon for closing the Prism. In some embodiments, the Secondary UI volume 120G receives input via its parent Prism. In other words, the parent Prism may determine if the Secondary UI volume 120G is displaying its carousel, and if so, the parent Prism redirects user input to the Secondary UI. The carousel of the Secondary UI volume 120G is disclosed below.

In some embodiments, the launcher may be the default "home" menu for the mixed reality system. The launcher may bring together multiple panels of content alongside a system status bar. Each panel may represent a different content type. Applications may be pulled from the launcher and pinned into the landscape for quick recall. The launcher itself may be placed into the landscape for customization per location and/or for quick access.

Launcher 130G provides the user with the ability to launch new applications into the user's landscape 110. The launcher 130N may be an application composed of a series of body-centric Prisms called panels. The panels may be vertically and horizontally scrollable and a user may switch between panels with a swiping motion, for example. In some embodiments, one panel may be visible at a time (e.g., a central panel), with its two neighboring panels visible as placeholder panels at its side. When the user swipes to the next panel, the placeholder panels may expand to show the full panel. Panels may include an Icon Grid application 160G, a Social panel 180G, and a Store panel 190G. In some embodiments, when the user swipes to the next panel, the panels themselves are not moved or changed, but instead, contents (e.g., icons) within the different panels may be animated in and out of the central panel (e.g., active panel). Furthermore, applications may be pulled from the launcher 130G and pinned into the user's landscape 110 for customization per location, discussed further below.

In some embodiments, an application 140 (in FIG. 1M) may communicate with the universe browser engine via a centralized rendering service client 150G on each application 140. The centralized rendering service client 150G may be in communication with a universe server 105G within the universe browser engine 130. The centralized rendering service client 150G may be a client service of a centralized rendering system that allows application(s) 140 and other applications that generate content for display in the user's landscape to communicate with the universe browser engine via the universe server 105G.

The universe server 105G may comprise a service of the centralized rendering system that allows the universe browser engine to communicate with applications that provide the content to be displayed in the user's landscape. In some embodiments, the communication may comprise more than rendering data, for example, input data, requesting a security privilege, requesting to show or hide the virtual keyboard, etc.

In some embodiments, the centralized rendering system may be a system of hardware and software resources dedicated to receiving graphical data from multiple applications to be displayed on a single display (e.g., in a user's landscape in the mixed reality system). The centralized rendering system combines graphical data from multiple applications 140 into a "centralized" data structure, such as a scene graph, which may be used to render, to a display, a scene reflecting the graphical data from the multiple applications in a realistic and efficient manner. In order to achieve the centralized rendering system, in some embodiments, an application may make changes to a local representation of the Prism called the Client Prism (e.g. Client Prism 115G). These changes may then be sent to the Universe Server 105G and stored in a Server Prism. The centralized rendering system may then render the updated data in the Server Prism. The centralized rendering system may hereinafter be referred to as the "Cali" or "Kali" system. The universe browser engine may be thought of as an enhanced version of the Cali Server, for example, because the universe browser engine can manage the Prisms in the real world.

In some embodiments, each application 140 that creates virtual content (e.g., 115a or 115b in FIG. 1F, 115 in FIG. 1H) for the universe browser engine communicates with the centralized rendering system and the universe browser engine via the centralized rendering service client 150G (hereinafter may be referred to as a "Cali client") installed on each of the respective application(s) 140. More information may be disclosed in a related U.S. Prov. Pat. App. Ser. No. 62/479,134 entitled "CENTRALIZED RENDERING", filed on Mar. 30, 2017, and which is hereby incorporated by reference in its entirety. The centralized rendering system improves the user's experience by ensuring that virtual content from multiple different applications are properly analyzed and processed, if necessary, to ensure the virtual content are displayed in a realistic manner to the user. In some embodiments, the universe browser engine is an instance of a Cali Server with additional functionality, such as managing Prisms. In some embodiments, a Client Prism is an instance of a Cali Client Volume and a Server Prism is an instance of a Cali Server Volume, with additional functionality, such as the ability to bring up an App Options display, to display a Loader Volume while the Prism is loading its content, to collide with other Prisms, and to be part of a Transform Tree.

Client Prism 115G-a and Client Prism 115G-b comprise virtual content that is generated by the application 140 and sent by the Cali Client 150G-a to the Universe Server 105G to be displayed in the user's landscape. In some embodiments, as the application 140 makes changes to the virtual content 115G-a and 115G-b, the changes to the virtual content are communicated from the Client Prism 115G to the Universe Server 105G, and that information is stored inside the universe browser engine in the corresponding Server Prism data structures (e.g., 113a or 113b in FIGS. 1F-1G or 113 in FIG. 1H). In some embodiments, the application 140 does not know where in the user's landscape a virtual content 115G-a is displayed. The universe browser engine may manage display location of the virtual content 115G-a via the corresponding Server Prism 113a that is associated to the Client Prism 115G-a (e.g., the virtual content 115a after it has been processed by the centralized rendering system).

The application 140 may request a new Prism by accessing Universe Server 105G. In some embodiments, the universe server 105G may be a software module in the universe browser engine that communicates with centralized rendering service client(s) 150G from applications that provide virtual content for display in the user's landscape 110. For example, when a user wants to launch an application and display virtual content from the application in the user's landscape, the application may provide the virtual content to the universe browser engine via the centralized rendering service client from the application to the universe browser engine centralized rendering service on the universe browser engine to be displayed in a Prism that may be anchored in the user's landscape.

In some embodiments, the icon grid application 160G may comprise a recent application section (not shown) and/or a general application section (not shown). The general application section comprises an icon representing each application installed on the mixed reality system. The general application section may be initially populated with a call to a Package Manager (not shown) to determine a list of installed packages. An icon is added for each application in each package. When the Package Manager notifies the universe browser engine of package installation and uninstallation, the icon grid application 160G adjusts its icons accordingly. The Package Manager Service manages the installation of applications and maintains information about those applications such as their names, icon graphics, security permissions, executable files and data files.

The recent icon section may be initially reconstructed from a log on disk, and then updated by calls from other services. The package name may be logged to disk when a Lifecycle Service notifies the launcher of an application start event, and when the Package Manager notifies the launcher of a package uninstallation event. A user may interact with the icon grid application 260 by choosing icons to launch, or extracting icons to place into the landscape.

The Lifecycle Service may be a centralized service that manages the process of starting, stopping, putting to sleep, and waking up applications. The Lifecycle Service also knows when applications terminate unexpectedly (crash). When any of these events happen, the service's listeners are notified, and the universe browser engine is one of the listeners. The universe browser engine accesses this service to start, stop, sleep and wake applications. In some embodiments, the Lifecycle Services provide application programming interfaces (APIs) for controlling the lifecycle of application processes running in the mixed reality system. The Lifecycle Services may spawn new processes to run application binaries with a set of permissions, and call APIs on a predefined interface implemented by the applications to control their lifecycle. The Lifecycle Service also provides a listener interface through which other modules may keep track of applications being started/stopped/paused/resumed. The Lifecycle Services may be a separate program from the launcher or the universe browser engine. In some embodiments, the Lifecycle Services may be a middleware.

In some embodiments, as shown in FIG. 1G, the icon grid application 160G comprises a centralized rendering service client 250b and a Client Prism 115G-c. As discussed above, in some embodiments, applications that display content within a user's landscape may send their content to the universe browser engine via the centralized rendering service client 150G in communication with the universe server 105G. Here, the icon grid application 160G, which provides the icons of installed applications on the mixed reality system, for the launcher menu, is like any other application that provides content for display in the user's landscape. However, in some embodiments, the icons within the icon grid application, when selected by a user, may instruct the universe browser engine to launch and startup a new application, at which point, the new application may request the universe browser engine to create a new Prism (e.g., through Universe Server 105G) so that the application may provide content to be displayed into the new Prism. If the application is already executing, the universe browser engine may request the application to open a new Prism.

The status bar application 170G comprises status indicators for the mixed reality system. The status indicators and the status bar application 170G may not be adjustable by the user. The status indicators may be initially populated by querying a first service for operating and maintaining Wi-Fi service, a second service for maintaining Bluetooth Service, and a third service for Status. When these services notify the Status Bar application 170G of an updated status, the status bar may adjust accordingly. The status bar provides the user quick glanceable information that they may react to quickly and efficiently from anywhere in the system. In some embodiments, the status bar may be displayed above the launcher. The four major sections in the status bar may be, for example, (1) global search, (2) notifications, (3) quick settings, and (4) power. Additional temporary sections may be added to the status bar when needed such as Music, Call, Sharing, etc.

When the user is in the Launcher menu, the status bar is condensed to glanceable icons. When the user swipes up to the top, it may trigger an animation and the status bar may expand. The status bar may stay up above the launcher while the user may swipe left and right through the launcher panels. When the status bar is highlighted, it may expand and animate forward. The sub-selection highlight may appear on the left by default, for example, on the global search. If there are other sections that have more pressing content (e.g., recent notifications, low battery, etc.) the sub-selection highlight may appear on that section instead.

The social panel application 180G may be composed of a series of contacts that the user may interact with. The social panel may be initially populated with a call to a Contacts Service for available contacts. Each contact may be added to the social panel and displayed to the user as an icon. When the social panel application 180G receives a new contact, updated contact, and removed contact events, the social panel application 180N may adjust its contacts information accordingly. The user may interact with contact icons by clicking on a contact icon to pop up an option menu with the various contact providers available. When the user selects a provider, the launcher application may start an associated application with the contact's information.

The store panel application 190G may allow the user to search for, download, and install application(s) 140 for the mixed reality system. When a user requests to download and install an application, the launcher application 130G may verify the user's identity with an identity verifying service (not shown), then may install the application with the Package Manager. The Lifecycle Service may be invoked if the user starts the application from the panel. In some embodiments, each panel in the launcher may function as separate applications instead of as one launcher application.

In some embodiments, the universe client 125G renders content specific for the universe browser engine. The universe server 105G does not render 3rd party applications. This is because content within a Prism can only be rendered by the universe client 125G and not the universe server 105G. Thus, to render the infinity Prism, loader volume/ Prism, and/or Secondary UI Prisms, work may need to be delegated to the universe client 125G to render those particular types of content for the server. An infinity Prism may be used by the universe to render additional graphics around Prisms, for example, when two Prisms collide. Infinity Prisms are discussed further below. With the loader Prism and the Secondary UI Prisms, there may be specific communication between the universe server 105G and the universe client 125G to coordinate certain functionalities.

For example, the universe server 105G may be told that an application is done loading. The universe server 105G may then notify a client-side loader Prism that was currently loading the application. The loader Prism would have to react to the event that the application is done loading by showing the animation. Once the client-side loader Prism is done showing the animation, the loader Prism may notify the universe server 105G that it is done animating. Then, the universe server 105G may react to notification that the loader Prism is done animating by force-placing the loader Prism, destroying the loader Prism, and displaying the App Prism with the rendered animation in place of the loader Prism). What has been disclosed is just one example of how the universe client 125G functions. One of ordinary skill in the art may appreciate there may be other examples of when the universe client 125G may assist the universe browser engine 130.

Figure 1H:
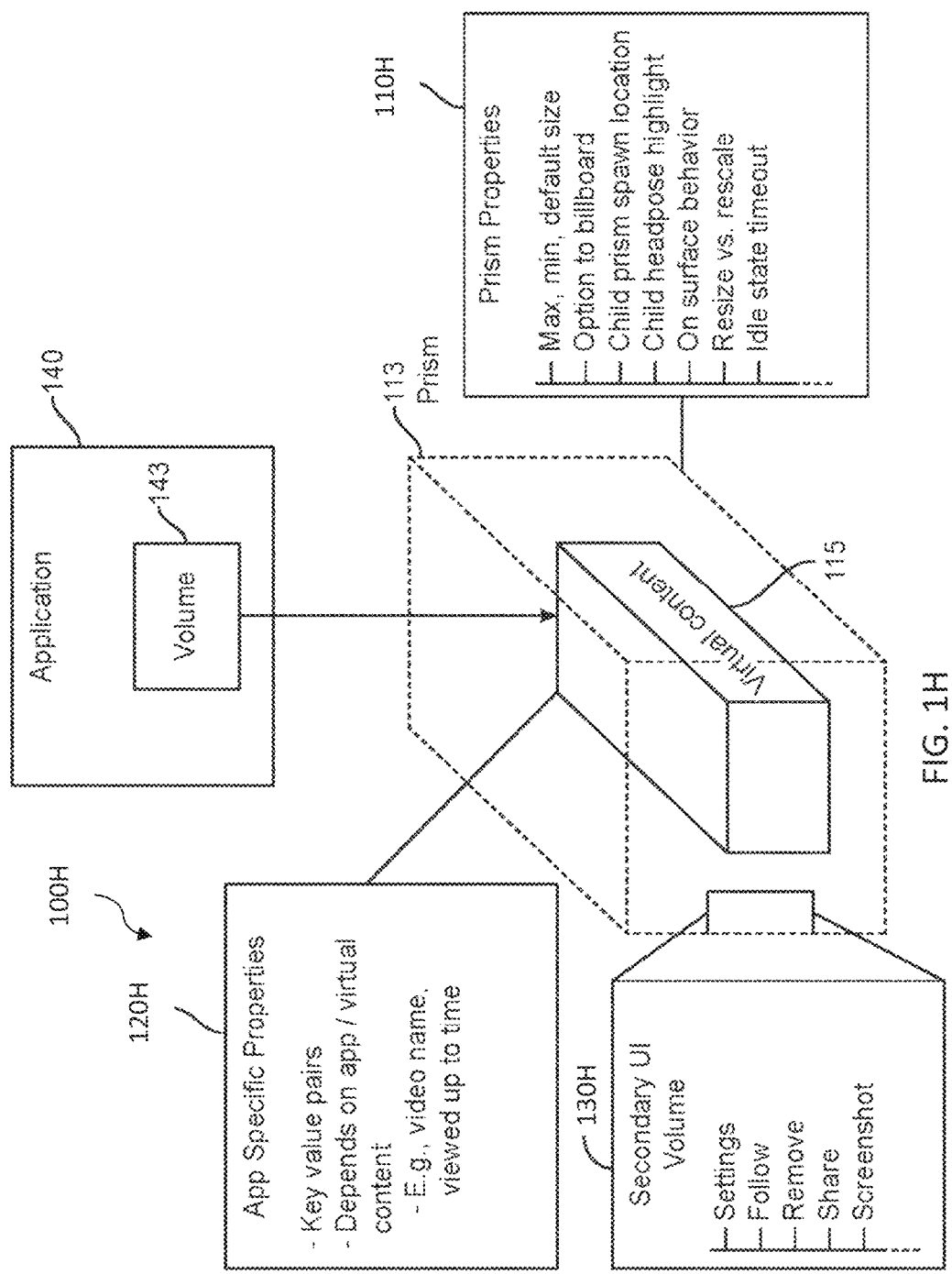
FIG. 1H illustrates an example of a prism in one or more embodiments.

FIG. 1H illustrates an example of a universe browser prism in one or more embodiments. Application content is presented to a user inside of one or more bounding volumes called Prisms. As discussed above, when a non-immersive application is executed in the mixed reality system, its content is rendered inside of a Prism. The properties and characteristics of a Prism allow the universe browser engine to consistently manage Prisms within the user's landscape.

The volume space of a Prism 113 may have clear and definitive boundaries as indicated with dashed lines in FIG. 1H. The boundaries provide a bounding volume for the virtual content 115 to only be displayed within the boundaries of the Prism 113. The boundaries of the Prism prevent the content from the application, displayed within the Prism, to overflow or spill outside of the Prism and into the user's landscape. The boundaries of the Prism 113 may not be displayed to the user when the user sees the virtual content 115 displayed within the Prism 113. This is an important feature because, in order to maintain a realistic display of a 3D content within the user's landscape, it is important to not show the boundaries of the Prism that are bounding the virtual content 115. One of ordinary skill appreciates the importance of not displaying the boundaries of the Prism that wraps around the virtual content 115 so the virtual content may be displayed in a more realistic way in the user's landscape. In contrast to 2D windows, the borders and boundaries of a 2D window is generally displayed so the user of the computer displaying the 2D windows may clearly distinguish content within one 2D window from content from another 2D window. In some embodiments, however, it may be advantageous to at least temporarily display the boundaries of the Prism, for example, to help troubleshoot problems with one or more applications.

Applications are given instances of Prisms 113 by the universe browser engine to place content within. Applications may render 2D and/or 3D content within the Prism 113 using relative placement algorithms and/or arbitrary transforms, but the universe browser engine is still ultimately in charge of gross interaction patterns such as content extraction. Multiple applications may render to the universe browser engine via the Prisms 113, with process boundaries separating the Prisms.

Each Prism allocated in the universe browser engine has an associated set of key-value properties that may be adjusted and may determine various bits of behavior or convey information about why a given Prism exists. Some properties are read-only for normal applications, but for applications with the private API, these properties are writable. A Prism 113 may comprise Prism properties 110H, application specific properties 120H, and virtual content 115. Additionally, some Prisms 113 comprise Secondary UI volume 130H for providing users with additional Prism management options. However, in some embodiments, Prisms may not have a Secondary UI volume 130H, for example, because these other types of Prisms (e.g., Launcher Menu Prisms) may not require the features provided by the Secondary UI volume 130H. As with the boundaries of the Prisms, the Secondary UI volume 130H may not be displayed to the user as well. When a user wants to make changes to a Prism, the user may initiate a request to display an Application Options Menu that displays the UI controls of the Prism within the volume space of the Secondary UI volume.

Depending on the application that they hold, Prisms may require different properties in order to afford the proper feedback and behavior for their content. Application developers may select from a number of pre-programmed options for their Prism when they create their application so their content may be represented correctly, based on their preferences. Below are examples of some of these options.

The Prism properties 110H define a Prism, at least in part, and allow the universe browser engine to manage and maintain the Prisms within the user's landscape. For example, Prism properties 110H may include one or more of a default size, a maximum size, a minimum size, an anchor/placement type (e.g., Option to billboard, etc.), a behavior of a given Prism to the anchor type, an anchor location, a child Prism spawn location, a child head pose highlight, an on surface behavior, an independent transformation control, a resize vs. rescale indicator, an idle state timeout variable, etc. The Prism properties 110H allow the universe browser engine the ability to track and manage each and every Prism within the user's landscape. Having a single application managing the virtual content displayed within the user's landscape assures content displayed within a user's landscape are displayed in a consistent and reliable manner. Some of the Prism properties 110H are further disclosed below.

Maximum, Minimum and Default Size: Applications may have upper and lower bounds specified by an application developer (optionally, with additional limits from the universe browser engine). Additionally, application developers may have a Default size when the application first launches.

Option to Billboard During Movement Sequence: Certain objects (e.g. content that is planar), make sense to billboard towards the user during a movement sequence to encourage legibility and less management. For example, a certain content displayed on a planar surface may be positioned at a specific location and/or relative to an object, but their orientation is automatically computed so that the content displayed on the planar surface always faces the direction of the user viewing the content displayed on the planar surface. Other optional body dynamics behaviors could be added to this as well.

Child Prism spawn location: Prisms may spawn children to create flexible layouts. The application developers should be able to determine a responsive range of locations in which the children may spawn relative to the parent Prism. Child Head pose Highlight: Applications may be able to choose whether head pose highlight on children Prisms may be treated as separate highlights or if it continues to highlight all Child/Parent Prisms as one unit.

Child Prism relational behavior: Prisms may determine whether their child Prism(s) may be anchored to them or not in translation, rotation and scale, and also choose whether the child Prism(s) will close with the main Prism.

On Surface behavior: Prisms may be snapped to a surface and query that surface to determine if they want a size/scale change. If the surface has space, the Prism may resize to fit all or a percentage of the surface and factor in field of view (FOV) of the user.

Independent transformation control: An application may request independent control over its translation, rotation, and scaling. This may allow the application to move and transform itself.

Resize vs. Scale: Some applications may choose to resize their bounds instead of only scaling their content. This may accommodate more content to be displayed within their bounds. This may function more like existing computer 2D windows.

Idle State Timeout: Applications may be able to choose how long it takes for them to go into their idle state. This may handle situations where applications may wish to continue playing content even though they are out of view. For example, an application that displays live video may wish to continue to display content and play audio even though the user has temporarily looked away.

The application specific properties 120H may be a list of key value pairs that stores the application specific state information for each Prism. The list of key value pairs is specific to the application and the key value pairs provide the state information of the content of the application that is being displayed or rendered within the Prism. The list of key value pairs may be different for each Prism, depending on the application that is rendering into the Prism. For example, if the application is a video streaming application, some key value pairs may include a video name, a viewed up to time for the video, an aspect ratio for displaying the video, etc.

Both the Prism properties 110H and the application specific properties 120H for each Prism may be stored within a data structure of the local database 137. The Prism data are constantly updated while the user is operating the mixed reality system and interacting with the Prisms. As discussed above, the Prism instance data of the local database 137 may be persisted by synchronizing with the external database 150 on a periodic basis. In some embodiments, the local database 137 and the external database 150 may be synchronized in near real-time.

When a user launches an application in the universe browser engine, the user may pull a Prism out of the Launcher Menu and place the resulting volume into space. Other methods of launching an application may be used, such as clicking on an application icon. In some embodiments, the user may move the Prism around in altitude and azimuth (on a spherical shell) by moving a controller/input device (e.g., a totem) up or down. To move the object closer or farther away, the user may use a joystick on the totem to "push" or "pull" the Prism, or may slide the user's finger over a touch sensitive part of the totem. This has the effect of changing the radius of the shell. In some embodiments, two buttons on the totem may cause the Prism to grow or shrink. Finally, rotating the totem itself may rotate the Prism. This assumes totems may have six degrees of freedom (DOF). This is consistent with the kind of controls used in VR painting applications, for example, but the totem could be any suitable user input device.

In some embodiments, Prisms may not allow themselves to be placed in such a way that they fully or partially intersect other Prisms. Prisms may either not intersect at all, or may not inhabit/be actively displaying at the exact same location (anchor point), with the exception that Prisms may overlap a small amount for physics purposes, as discussed below. If more than one Prism is placed in the exact same location, the active application may be displayed and other applications anchored at the exact same location may be hidden. The user may be able to tell there are multiple applications at a location by, for example, dots displayed in the volume. For example, if there are three Prisms/applications at a particular spot, there may be three dots. If the user is viewing application #2 of three, then the second dot may be brightened, while the other dots may be dimmed. The user may then swipe or scroll through different applications.

The graphics may switch, and the dots may update (e.g., by brightening the active dot) to show which application is currently active.

In some embodiments, several Prisms may be co-located at the same anchor location. At first glance, this may seem like an odd thing to do. With all of 3D space available for placing applications in the user's landscape, why place them in the same spot? For example, a user's favorite place to play virtual board games may be on a kitchen table. In the morning the user may like to play "Ticket To Ride" while eating breakfast. But when the user gets home from work, the user may like to play "Risk" against a computer. The user may have a plurality of board games located in the same spot, and switch between them when necessary.

In some embodiments, Prisms may be placed at an arbitrary location in space. In this case, the Prism may be anchored by a center point of the cubic/rectangular volume. But if (e.g. during placement) a Prism is moved near a horizontal surface in the landscape, the Prism may try to snap to the surface. The anchor point may then become the center of the bottom plane of the Prism. Similarly, if a Prism is moved towards a vertical surface (e.g. a wall) then it may try to snap to it, and the anchor point may become the side of the Prism that is next to the vertical surface.

The purpose of an anchor point may be to place the Prism so that it does not interpenetrate with the surface the Prism is anchored to. The anchor point may also move with the object it is anchored to. When multiple Prisms share the same location, that location may be the anchor point and not the center point of their respective volumes. Applications do not know and do not need to know where they are located, but the applications may ask their respective Prism to see how the respective Prism is being anchored. Applications may also specify which anchoring types are valid. For example, it doesn't make sense to anchor a Halcyon to a vertical surface.

All of the content (graphics) for the application may be contained within the volume of the Prism. The universe browser engine may mask out graphics that extend outside the Prism automatically. Because applications don't know about other applications in the world, the universe browser engine may manage interactions that happen between different Prisms of different applications.

The user interface design for placing Prisms may call for Prisms to sway in a physical way (like an object on a string) while the Prisms are being moved in the placement state. Instead of trying to predict what kinds of physical behaviors different applications are going to want, the Prism may feed movement information to the application (through a binder interface) while it's being placed. The application may then behave appropriately.

There may also be physical behavior between Prisms as they are being placed. This may override the application's physicality implementation, and the application may stop receiving movement data. Prisms may initially resist intersecting. If the user continues to push two Prisms into the same location, then the Prisms may snap to the anchor location of the Prism it's intersecting with. This could be done in a way that feels elastic (e.g., similar to soap bubbles interacting with one another) and is roughly based in physics.

Audio emitters may be placed as child nodes in an application's scene graph. These nodes may be local to a root node transform. Thus, a Prism may be moved wherein the movement of the Prism does not require the application to update the audio node's transform. The universe browser engine may be responsible for the final transform of the audio emitter to the world space. The Prism may also be responsible for constraining audio nodes to its boundaries. Applications may not emit audio from a point outside of their respective Prisms.

In some embodiments, it may not be desirable to spatialize audio. For example, if a user places a virtual television (TV) on a wall, and is focused on the TV image, the TV's audio may be provided through to the user without modification. This is likely to provide a better audio experience to the user. In the case of surround sound, the audio signal already has spatial information. The sound may be emitted from virtual speakers placed in optimal locations relative to the TV.

In some embodiments, on a button press to control audio strength by the user, the universe browser engine may check the head pose to determine which Prism the user is looking at and send a volume-up or volume-down event to the corresponding Prism. The Prism may forward that information on to the application running in the Prism, and the application could decide how to interpret it. If there are no applications in focus in the landscape, then volume button settings may adjust the global volume.

In some embodiments, one difference between traditional 2D windows and Prisms 113 is that with 2D windows, borders that set the boundaries of a 2D window are intended to be seen by users to provide a concrete border for encompassing content within the 2D window separate from content outside of the borders of the 2D window. However, in some embodiments, borders of the 3D windows (e.g., Prisms 113) are meant to be invisible. If users can see the outline (e.g., borders) of every Prism, it would break the illusion of "reality" and the virtual content displayed within the Prism having its borders displayed would appear like computing/digital/virtual content instead of real. In some embodiments, the borders may be displayed, for example to enable user manipulation as needed.

Another difference is that 2D windows are commonly meant to be controlled and/or interacted with by the user. For example, a close button may be always appearing in the upper right-hand corner of a traditional 2D window, or a menu bar may be displayed at the top border of a 2D window. However, with the Prisms, a user generally does not interact with the Prism and its boundaries. Instead, a secondary menu (e.g., an apps option menu) may be pulled down temporarily for the user to control and manage/manipulate the Prism from a list of options.

Furthermore, 2D windows are independent from its surroundings. For example, what is displayed on a computer screen does not automatically change if the user moves the screen. However, Prisms need to be placed in context with the real world. For example, each Prism may be placed into the real world relative to (1) objects in the real environment such as a wall, a table, etc.; (2) virtual objects created to provide a backdrop or canvas for the Prism to anchor to; and/or (3) the user. In some embodiments, the Prisms may be placed in context with a passable world as well as the real world.

Yet even further, in some embodiments, Prisms may not be allowed to overlap/interpenetrate with one another, with the exception that Prisms may overlap a small amount for physics purposes. For example, in some embodiments, when virtual content within two or more Prisms collide, the virtual content may appear to show a bounce between the two virtual contents when they appear to collide with one another. Here, the Prisms may overlap for a small amount to create the effect of the bounce between the two virtual content. In some embodiments, when the bounding boxes for two or more Prisms collide, the Prism, and hence the Prism's content, may appear to bounce.

However, 2D windows on a computer do overlap and, in many cases, 2D windows may be cascaded on top of one another, hiding each other from view of the user. In some embodiments, if two Prisms are anchored at the same location in the user's landscape 110, one of the Prisms may be displayed while the other Prism is minimized from display wherein an icon or a text or an image (or any other visual indicator) is displayed to indicate to the user that another Prism is anchored at the exact same location. In some embodiments, an infinity Prism may be implemented to render additional graphics around Prisms, for example, when they collide. In some embodiments, an infinity Prism may be a Prism with its bounds set to infinity.

For example, if two Prisms are close to colliding, the universe browser engine may render a glow in the region of space between the two Prisms. In order to handle these exceptions, the universe browser engine may create an infinity Prism that may encompass all space around/surrounding the two Prisms, the user's entire field of view (what the user can currently see), the user's entire field of regard (what the user could see if they moved around), etc. This may allow the universe browser engine to draw graphics anywhere between the two Prisms. In some embodiments, the infinity Prism may not collide or interact in any way. In some embodiments, the infinity Prism does not have a secondary UI, etc. In some embodiments, only the universe browser engine may have access to the infinity Prism. The infinity Prism may be created at universe browser engine initialization and may always be present until the universe browser engine shuts down. In a second example, an infinity Prism may be useful in order to have a character (e.g. avatar, personal assistant, butterfly, animal, etc.) move between the other landscape apps to, for example, explain to the user what each application is and/or how to use the application.

Figure 1I:
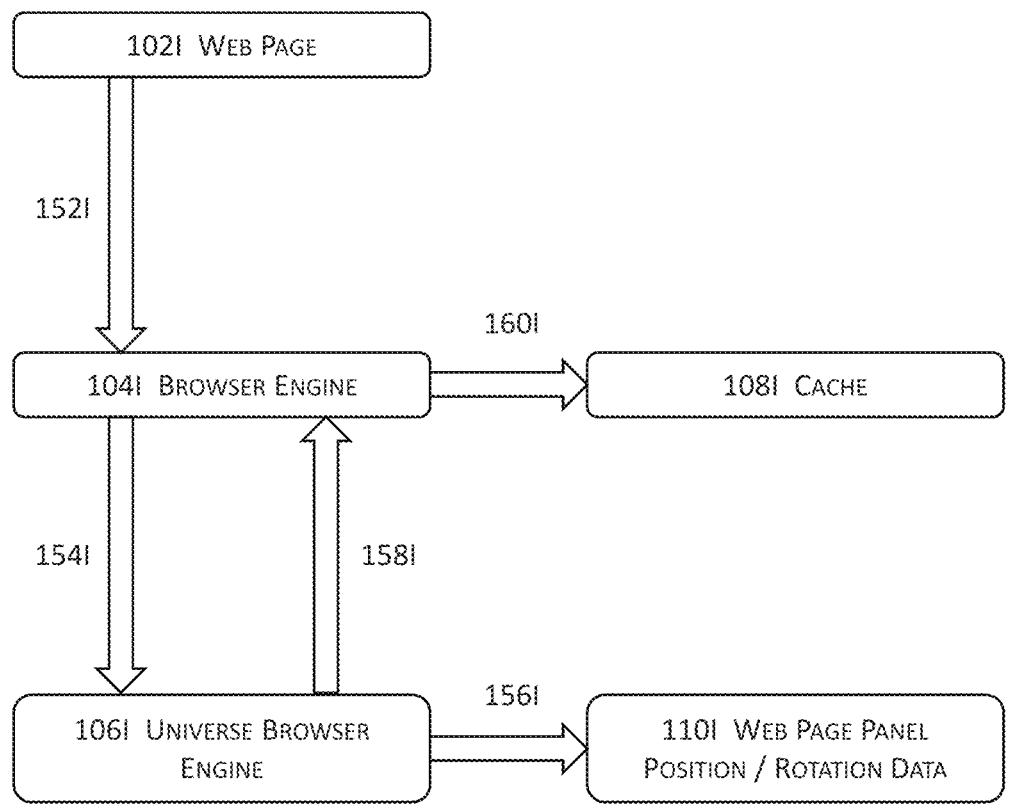
FIG. 1I illustrates an example of initialization of a browser for displaying a web page and resetting the position and/or rotation data of the web page panel to default in one or more embodiments.

FIG. 1I illustrates an example of initialization of a browser for displaying a web page and resetting the position and/or rotation data of the web page panel to default in one or more embodiments. In this example, a browser (104I) initializes to load a web page of interest (102I). The browser (104I) functions in conjunction with a universe browser engine (106I) that transmits the default position and rotation data to the browser engine (104I) at 158I. The universe browser engine (106I) further resets the position and rotation data of the web page panel for the web page at 156I. The browser engine (104I) receives the default position and rotation data from the universe browser engine and stores the default position and rotation data in a non-transitory computer readable medium (108I) at 160I.

Figure 1J:
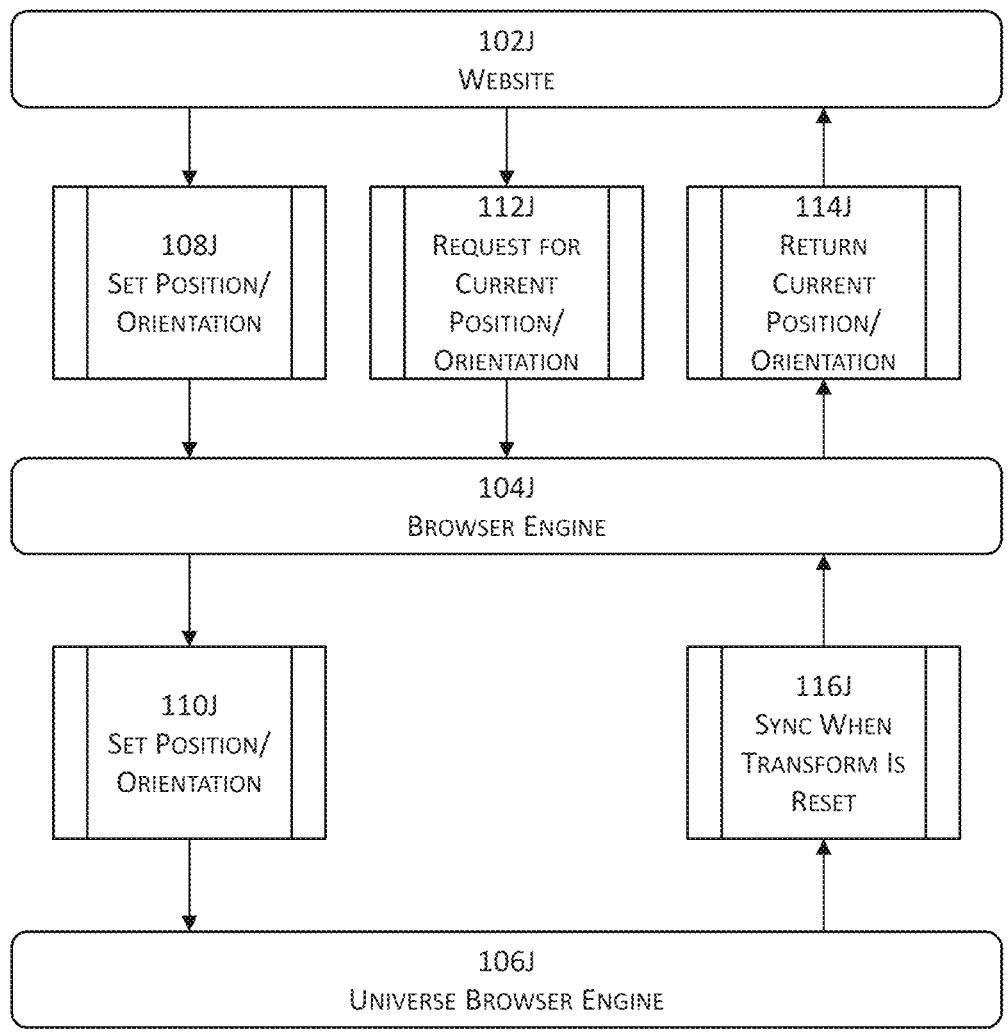
FIG. 1J illustrates another high-level block diagram of a simplified system that interacts with a website for managing and displaying productivity applications and/or productivity resources in a three-dimensional virtual space with a mixed reality system in one or more embodiments.

FIG. 1J illustrates another high-level block diagram of a simplified system that interacts with a website for managing and displaying productivity applications and/or productivity resources in a three-dimensional virtual space with a mixed reality system in one or more embodiments. More particularly, the universe browser engine 106J may transmit the position and rotation data of a web page to the browser engine 104J to store such data in the browser engine 104J. A universe browser engine (e.g., 106J) may serve as a 3D windows manager that is analogous to a 2D windows manager that is running on a laptop or desktop computer for managing 2D windows displayed on a display screen of the laptop or desktop computer. A universe browser application functioning in conjunction with a universe browser engine also manages the generation, placement, and display of virtual contents in a user's landscape via the mixed reality system. When a browser engine 104J initializes (e.g., when a user launches the browser) to display a web page or contents therein of a website 102J, the browser may set the position and rotation data of the web page to be rendered by the browser engine 104J when the website is coded to incorporate a set of APIs that are coded to both set the position and rotation data to a client's browser and to obtain the position and rotation data from the client browser (108J).

A browser engine is often a software component of a web browser that performs tasks such as transforming HTML and/or other resources of a web page into an interactive visual representation on a user's device (e.g., a mixed reality headset). The following description may reference Chromium or Chromium-based browsers although other browsers (e.g., Mozilla's Firefox, Apple's Safari, Microsoft's Edge and Internet Explorer, Google's Chrome, Opera, 3D browsers, etc.) are also contemplated; and the techniques apply with full, equal effects to different browsers that correspond to their respective browser engines (e.g., Gecko for Mozilla, WebKit for Safari, Blink for Chrome, Chromium-based browsers, Microsoft's Edge, and Opera, and Trident for Internet Explorer, etc.)

The browser engine 104J may include any publicly available browsers such as the browsers mentioned immediately above or any custom browsers (e.g., 3D browsers). One of the functions of the browser engine 104J is to provide the functions including, for example, transforming HTML documents and other resources of a web page into an interactive visual representation on a user's device with the position and rotation data for the web page, calculating the graphical coordinates for the visual representation using the position and rotation data provided either by the website or by the universe browser engine 106J, painting or rendering the prism (or a portion thereof), etc.

This set of APIs pertaining to one or more embodiments for managing and displaying webpages described herein may include an API that complies with the Portable Operating System Interface (POSIX) API standard and is platform- or operation system-independent to provide spatial computing functionality. This set of APIs may be incorporated into the code of a website in some embodiments as previously described above and/or may be integrated into a part of the operation system or software applications residing on the mixed reality system in some other embodiments.

This set of APIs not only sets and gets the position and rotation data between the website 102J, the browser engine 104J, and the universe browser engine 106J but also functions in conjunction with a runtime layer and one or more 3D engines between the operating system and software applications (or more precisely between the operating system service layer and software applications). This runtime layer includes libraries, applications, services, etc. and provides (either alone or in conjunction with a 3D engine) an advanced graphical user interface for the underlying mixed reality system as well as various computing functionalities such as three-dimensional translation and rotation transforms, 3D models with material and skeletal 3D model animations, 2D sprite animation, high fidelity spatialized text rendering for spatial computing, 2D and Sound-field Audio, 2D and stereoscopic video, rigid body collision physics, real-time particle FX, input events and haptics control, hand gestures, speech recognition and speech-to-text, real-time spatial computing technology for rendering objects, lighting, shadows, and real-world occlusion, etc.

For example, this runtime layer may include a set of three-dimensional translation and rotation transforms that may be applied to, for example, a prism (which will be described later), a virtual object, a browser window, a rendered web page, etc. displayed in the virtual three-dimensional space such that the virtual object, browser window, rendered web pages, etc. or any attributes thereof (e.g., display coordinates, sizes, shapes, perspective, lighting effects, etc.) appear to be or are perceived to be real or close to real by a user.

Returning back to FIG. 1J, with the set of APIs, the website 102J may send a position and/or rotation request (112J) from the browser engine 104J. In this case, the browser engine 104J may transmit the most recent position and rotation data to the website (114J). As described above, the universe browser engine 106J may store the position and rotation data in or with the browser engine 104J (e.g., in a cache accessible by the browser engine 104J) so that the browser engine 104J may respond to such requests from websites 102J without additional delay from, for example, obtaining such position and rotation data from the universe browser engine 106J.

In addition to returning the latest position and rotation data (114J) to the website 102J, the browser engine 104J may transmit the position and rotation data (110J) either alone or together with a rendered web page to the universe browser engine 106J. The universe browser engine 106J creates or identifies a prism (or a smaller volume thereof) based on the position and rotation data received via 110J; and the universe browser engine 106J synchronizes the position and rotation data (116J) with the browser engine (104J). The universe browser engine 106A may call the browser engine 104J to invoke its native functions, libraries, and/or APIs (e.g., RenderWidget, OpenGL APIs, OpenGL ES 2.0 APIs, etc. in Chromium or WebKit, Almost Native Graphics Layer Engine, Direct3D APIs, WebGL, Gfx API's, etc., or any combinations thereof) to render the contents of a webpage for display in the prism or a portion thereof based on the position and rotation data.

In some embodiments, the universe browser engine may invoke one or more 3D engines running above the operating system core and the operating system services in the operating system stack to render 3D contents. These one or more 3D engines may include commercially or publicly available 3D engines (e.g., Unreal Engine 4, Unreal Engine 3, CryEngine V, Unity 3D, Source Engine, Source Engine 2, etc.) that provide an abstraction layer of the graphics processing unit (GPU), any custom 3D engines for 3D and/or 2D graphics. In some of these embodiments, a mixed reality system needs not incorporate the entire 3D engine. Rather, the mixed reality system may incorporate a smaller portion such as a rendering engine or rendering APIs, a physics engine for emulating the laws of physics, a scripting engine for parsing and executing scripts such as JavaScript scripts, a memory management module, and/or a threading module, etc. In some embodiments, a mixed reality system described herein may invoke a renderer for rendering 2D contents and a separate renderer for rendering 3D graphics.

The user may further alter the position and/or rotation of the webpage displayed in the virtual 3D space through the mixed reality system. For example, a user may freely move and/or rotate the displayed webpage, a placeholder therefor, or a mini-preview version of the webpage by grabbing the software handles that are respectively associated with positioning and rotating the displayed webpage, a placeholder therefor, or a mini-preview version of the webpage. The position and/or rotation data of the web page is thus modified; and the universe browser engine 106J may further synchronize (116J) the position and/or rotation data with the browser engine 104J. Once the browser engine 104J then replaces the original position and/or rotation data with this modified position and/or rotation data.

Figure 1K:
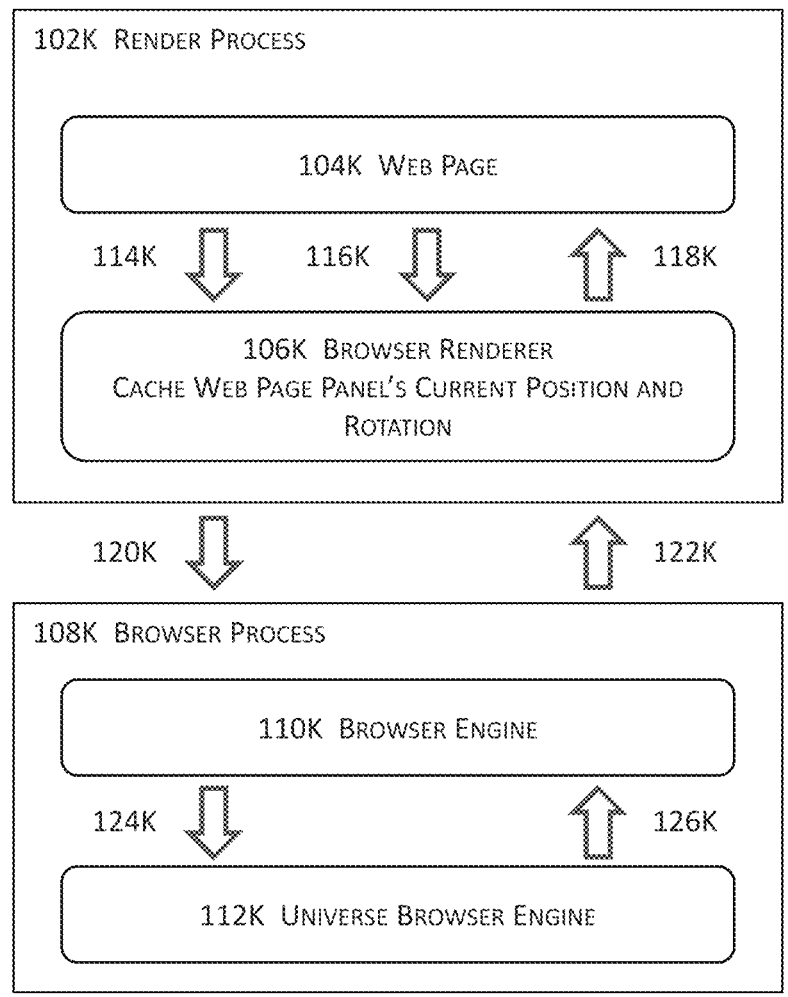
FIG. 1K illustrates a simplified high-level architecture architectural diagram of an example render process and an example browser process in some embodiments.

FIG. 1K illustrates a simplified high-level architecture architectural diagram of an example render process and an example browser process in some embodiments. In these embodiments, the render process 102K includes an instance of a web page 104K and an instance of a web browser renderer 106K. A web browser renderer may cache a web page panel's current position and/or rotation data in, for example, cache memory in some embodiments. The web browser renderer 106K may return the current position and/or rotation data to the web page 104K at 118K. The web page may also get the position and/or rotation data from the web browser renderer 106K at 116K. Moreover, the web page may also set the position and/or rotation data for the web browser renderer 106K at 114K.

The web browser renderer may cache a Web page panel's current position (and/or rotation) at 106K and may be operatively coupled to a browser engine 110K and send communications (e.g., one or more inter-process communication or IPC messages) to the browser engine 110K to set the position and/or rotation. For example, a web browser renderer 106K may send FrameHostMsg_SetVirtualPosition to the browser engine 110K to set the web page panel's 3D position and/or may send FrameHostMsg_SetVirtualRotation to the browser engine 110K to set the web page panel's 3D rotation at 120K. Furthermore, the browser engine 110K may also send communications (e.g., one or more inter-process communication or IPC messages) to the web browser renderer 106K to update the position and/or rotation data of the web page panel. For example, a browser engine 210NN may send ViewMsg_UpdateCachedVirtualPosition to the web browser renderer 106K to update the cached web page panel's 3D position and/or may send ViewMsg_UpdateCachedVirtualRotation to the browser renderer 106K to update the cached web page panel's 3D rotation at 122K.

The browser engine 110K may also be operatively coupled to a universe browser engine 112K to set the position and/or rotation data for a web page panel at 124K. The universe browser engine 112K may also initialize or update a web page panel's position and/or rotation data and communicate the web page panel's position and/or rotation data to the browser engine 110K at 126K. For example, a user may change the position and/or rotation of a web page panel. In response to the user's manipulation of the web page panel's position and/or rotation, the universe browser engine 112K may send the web page panel's position and/or rotation data to the browser engine 110K at 126K. As another example, a universe browser engine 112K may initialize a web page panel with certain position and rotation data and communication this position and rotation data to the browser engine 110K at 126K.

Figure 2A:
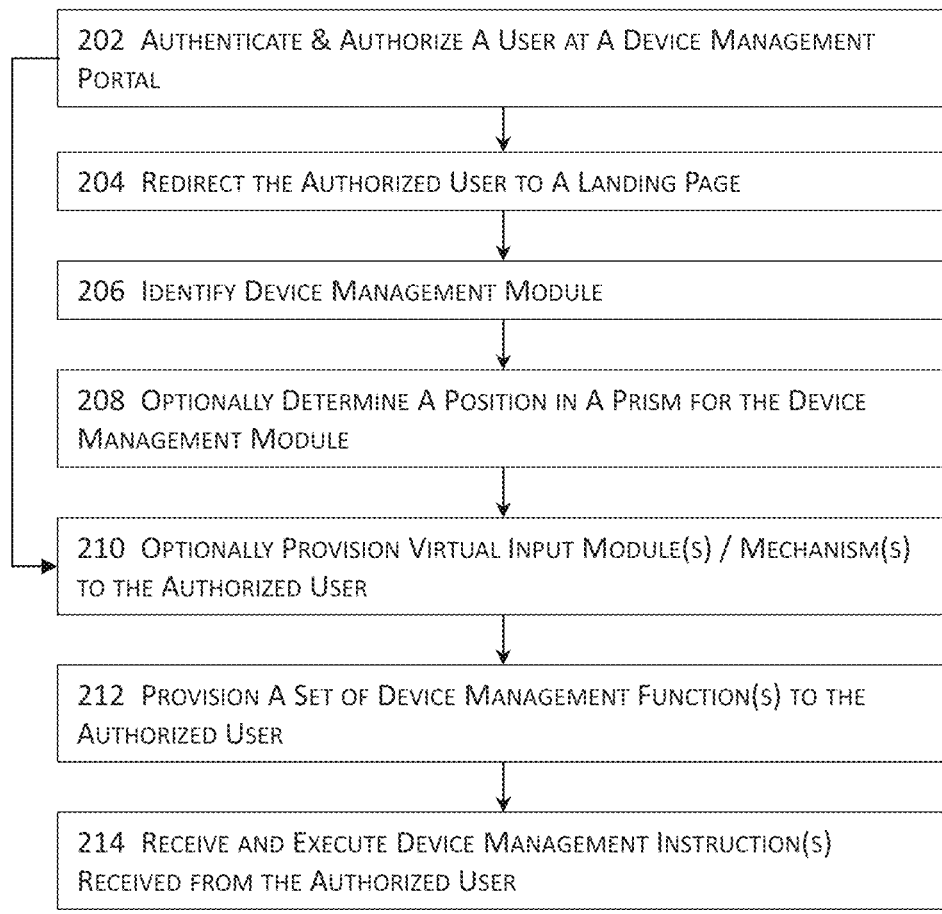
FIG. 2A illustrates a simplified high-level flow diagram for management of one or more mixed reality systems or devices in one or more embodiments.

FIG. 2A illustrates a simplified high-level flow diagram for management of one or more mixed reality systems or devices in one or more embodiments. In these embodiments, a user attempting to access device management functionality of an MR device may be authenticated and authorized at 202. In some embodiments where the user and the MR device belong to a managed group (e.g., an enterprise, a company, a managed network domain, etc.), the user may be authenticated by using the user credentials for the managed group and may be authorized to have certain predefined privileges and rights based at least in part upon the user credentials for the managed group.

In some embodiments where a user attempts to log into the management software application via an MR device, the MR device may provision one or more physical and/or virtual input modules may be presented to the user at 210 to facilitate the authentication and/or authorization process. For example, the MR device may invoke a biometric authentication scheme that invokes an image capture device (e.g., an inward-facing camera) that captures an image or a sequence of multiple images of a part of a user (e.g., a user's eye or a portion thereof (e.g., the iris of an eye), the face of the user, etc.) to authenticate the user through the biometric authentication scheme. In some embodiments where an MR device includes a fingerprint scanner, the MR device may also authenticate a user through a fingerprint authentication scheme.

Once the user is properly authenticated and authorized, the user may be directed to a page of a device management portal of a device management application or suite at 204. The device management application or suite may be locally installed on the MR device or on a computing device. When a user uses a computing device (e.g., a terminal, a computer, etc.) to access the device management application to manage various aspects of one or more MR devices, these one or more MR devices may be connected to the computing device wirelessly and/or through wired connection(s). In some embodiments where a Web browser is used to access the device management application, the authenticated and authorized user may be directed to a landing page of the device management portal at 204.

A device management module may be identified at 206 for the user based at least in part upon the privileges and rights determined at authorization. Users having different privileges and/or rights may be presented with different variants of the same device management module so that different sets of device management functions are exposed to users having different privileges and/or rights. For example, a user may not be authorized to change a list of software applications permitted to execute on or through an MR device or to connected to one or more unauthorized networks (e.g., unprotected wireless networks), while an administrator or superuser may be authorized to perform any of these changes.

In some embodiments where the user logged into the management software application via an MR device, one or more physical and/or virtual input modules or mechanisms may be provisioned to the authorized user so that the authorized user may use the one or more physical and/or virtual input modules to facilitate the performance of various functions with the management software application. For example, the MR device may provision one or more outward-facing cameras to capture user's gestures as input commands, a microphone to capture voice commands from the user, one or more inward-facing cameras to track the gaze direction of the user to determine which part of the management software application the user is gazing at, etc.

In some embodiments where an MR device presents a 3D representation of the management portal or the management software application to a user, a position and/or an orientation of the management portal or the management software application at 210. In some embodiments, the position and/or the orientation is determined relative to the authenticated and authorized user. In some embodiments, the position and/or orientation may be determined to be the default position and/or orientation (e.g., positioned at the center and oriented towards the user in a prism defined for the MR device) in some embodiments or a custom position and/or orientation based at least in part upon the user's input. For example, the user may designate a prism to place the management portal or the management software application. As another example, the user may provide the size, position, and/or orientation for the presentation of the management portal or the management software application. In some embodiments, the use may adjust the size, position, and/or orientation of the management portal or the management software application after it is placed in a prism and presented to the user.

A set of device management functions may be provisioned at 212 to the user. As described above, the set of device management functions may be determined based at least in part upon the privileges and/or rights of the user authenticated and authorized at 202. In some embodiments, the set of management functions may be defined or referenced in the profile that corresponds to the user. With the set of device management functions provisioned, the MR device may receive and execute instructions received from the user to perform one or more device management functions according to the instructions.

Figure 2B:
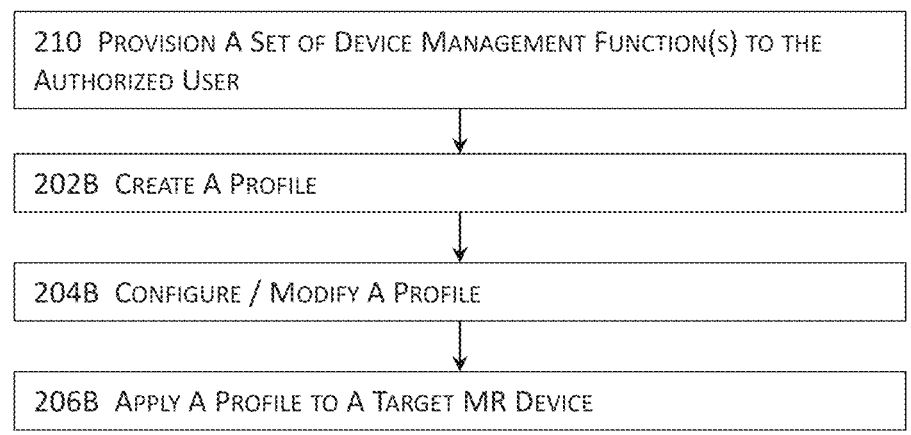
FIG. 2B illustrates a more detailed flow diagram about a portion of the simplified high-level flow diagram illustrated in FIG. 2A in one or more embodiments.
Figure 3A:
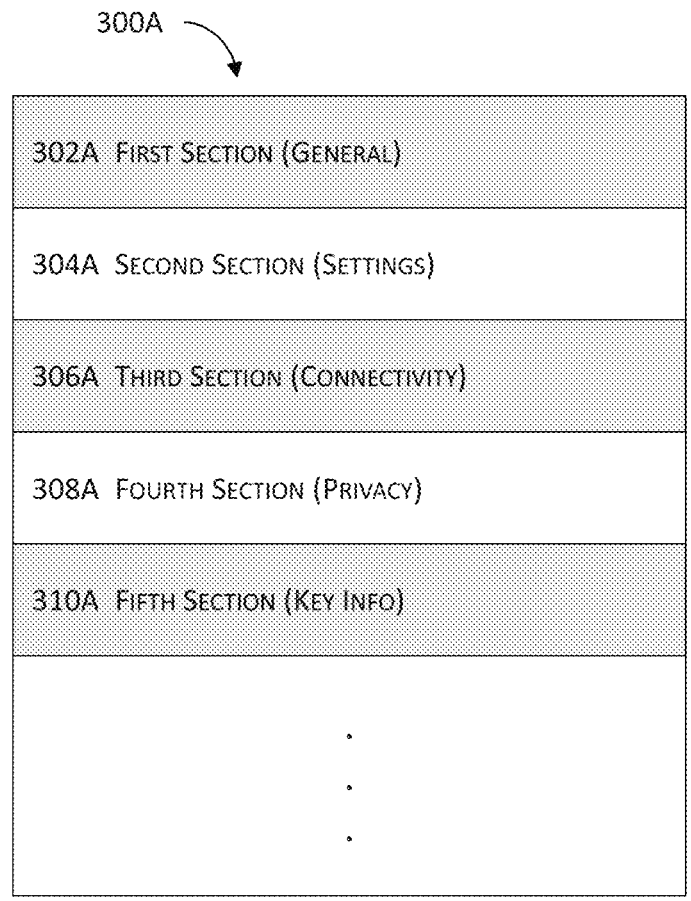
FIG. 3A illustrates a topology of an example profile for management of mixed reality systems or devices in one or more embodiments.

FIG. 2B illustrates a more detailed flow diagram about a portion of the simplified high-level flow diagram illustrated in FIG. 2A in one or more embodiments. More specifically, FIG. 2B illustrates more details about provisioning a set of device management functions to a user. In some embodiments, a user may execute a profile generation or editing function to create a new profile at 202B. For example, an administrator may modify an existing profile to change a list of software applications that is permitted to execute on an MR device, to alter permissible networks that the MR device may be connected to, etc. A user may also configure or modify an existing profile at 204B and apply a profile to a target MR device at 206B. For example, a user or an administrator may apply a resetting profile to a target MR device to reset the MR device to factory default while erasing all user data and information from the MR device. More management functions are described below with reference to FIGS. 3A-3B illustrating some example profiles.

Figure 2C:
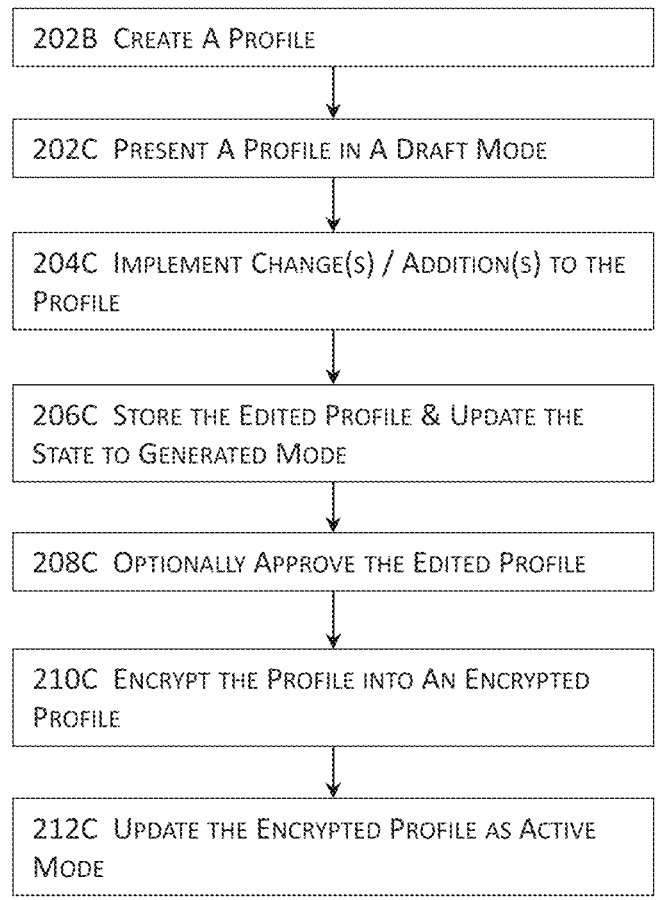
FIG. 2C illustrates more details about a portion of the more detailed flow diagram illustrated in FIG. 2B in one or more embodiments.

FIG. 2C illustrates more details about a portion of the more detailed flow diagram illustrated in FIG. 2B in one or more embodiments. More specifically, FIG. 2C illustrates more details about a process for creating a profile at 202B in the flow diagram illustrated in FIG. 2B. In some embodiments, in response to an instruction to create a profile anew, a profile with or with preset value(s) and/or setting(s) may be first set to a draft mode at 202C. For example, a multi-bit (e.g., 2-bit) state or flag for the profile may be set to reflect that the profile is currently in a draft mode. A profile in a draft mode is amenable to changes yet cannot be published (e.g., for other users to download) or applied to any MR devices.

One or more changes or additions may be implemented in the profile in the draft mode at 204C. For example, various fields of the profile may be filled manually by a user, automatically filled by the management software application, or partially filled manually by a user and the remainder automatically filled by the management software application. In some embodiments, a profile template may be applied to the profile in the draft mode to apply (e.g., add, modify, or replace) one or more sections, one or more values, one or more parameters, one or more settings, etc. to the profile in the draft mode.

The currently edited profile may be stored at 206C in a volatile and/or non-volatile memory, and the profile may be updated from the draft mode to the generated mode at 206C. A profile in the generated mode may be locked to prevent further modifications in some embodiments. In some embodiments where a catalog or database is maintained for profiles, the catalog or database may also be updated to reflect the addition of the profile when or after the profile is stored at 206C. Profiles in the generated state may be published yet may not be applied to MR devices. In some embodiments, publication of profiles in the generated state may be limited. For example, the publication of profiles in the generated state may be limited to specific users who are authorized to comment on, review, and/or approve these generated profiles. The edited profile stored at 206C may be optionally approved at 208C. For example, the user creating the edited profile may submit the edited profile for review and approval.

In some embodiments, the profile stored at 206C may be optionally encrypted at 210C. In these embodiments, the encrypted profile may be transmitted directly to MR devices in the encrypted state to enhance security and protection. The MR devices receiving the encrypted profile may apply the profile in the encrypted state directly in some embodiments or may decrypt the encrypted profile into a decrypted profile before applying the decrypted profile to the MR devices.

For example, a profile application module may decrypt the encrypted profile, store the decryption result in a volatile memory without storing the decryption result in a file system, apply the decryption result to the MR device, and remove the decryption result from the volatile memory once the application is complete or incrementally remove segments of the decryption result from the volatile memory as these segments are applied to or are being applied to the MR device in some embodiments. Once the edited profile is encrypted at 210C, the state of the profile may be updated from the generated mode to the active mode. Profiles in the active mode may be published, downloaded by authorized users, and applied to MR devices. In some embodiments, profiles in the active mode may be published to a broader range of users that profiles in the generated mode. A profile in the active mode may be configured to prevent further editing in some embodiments. In these embodiments, one way to supersede a profile in the active mode is to obsolete the profile by setting another state or flag of the profile to obsolete.

Figure 2D:
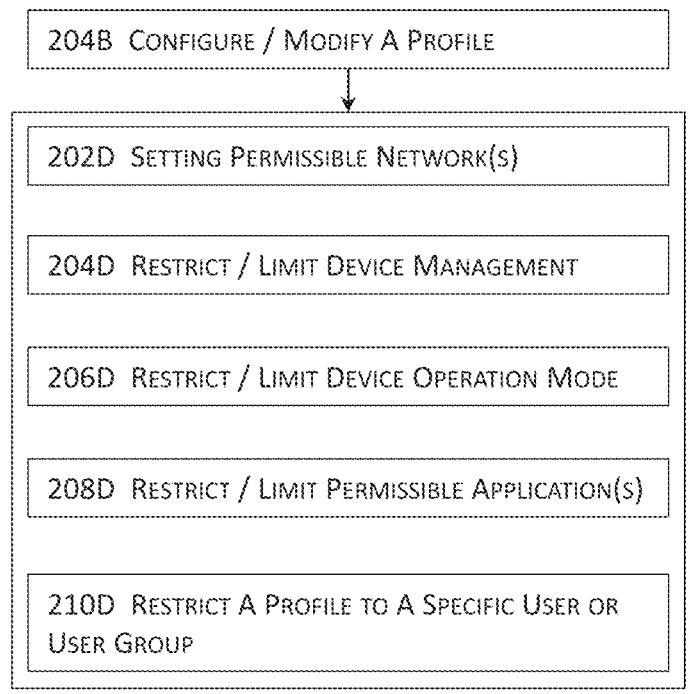
FIG. 2D illustrates more details about another portion of the more detailed flow diagram illustrated in FIG. 2B in one or more embodiments.

FIG. 2D illustrates more details about another portion of the more detailed flow diagram illustrated in FIG. 2B in one or more embodiments. More specifically, FIG. 2D illustrates more details about configuring or modifying a profile at 204B in FIG. 2B. In these embodiments, configuring or modifying a profile may include setting one or more permissible networks at 202D for the profile. A profile, once applied to an MR device, may control which network the MR device may be connected to, and the networks that the MR device is permitted to connect to may be controlled, defined, or otherwise referenced in the profile currently applied to the MR device.

In some embodiments, MR devices described herein may be permitted to join wireless networks protected by, for example without limitation, WPA (Wi-Fi Protected Access), WPA2, WPA3, WPA-personal, WPA2-personal, WPA3-personal, WPA Enterprise, WPA2 Enterprise, and/or WPA3 Enterprise certification. In some embodiment, the profile may require that the network corresponds to a password that may be encrypted at the time it is entered on the management portal by using, for example, a key specific to a user or a group of users for safe storage and retrieval, and that the key file may be applied to an MR device when applying the profile with a preconfigured network that the MR device is allowed to join.

Configuring or modifying a profile may further include restricting or limiting device management at 204D. For example, a profile may be configured or modified to restrict factor reset of an MR device to which the profile is applied. As another example, a profile may be configured or modified to restrict or limit changes to one or more device settings of an MR devices to which the profile is applied. A profile may also be configured or modified to restrict or limit whether a user may install and/or uninstall software applications on the MR devices to which the profile is applied.

Configuring or modifying a profile may further include restricting or limiting device operation mode at 206D in some embodiments. For example, a kiosk profile, once applied may enable or disable the kiosk mode. A kiosk mode may lock an MR device into one or more predetermined applications and/or restrict an MR device by specifying the one or more predetermined software applications in the kiosk profile. A kiosk mode may also limit an MR device to one or more permissible networks to which the MR device may be connected by specifying the one or more permissible networks in the kiosk profile. A kiosk mode may further restrict one or more undesired or unauthorized networks to which an MR device may not be connected. A kiosk mode may also restrict whether the users of an MR device may install and/or uninstall software applications for the MR device.

For example, an MR device in the kiosk mode may only execute one or more permissible software applications and may prevent the users to execute any other software applications. For example, an MR device in the kiosk mode may be limited or restricted to execute a single software application, and that the user will be prevented from exiting or navigating away from the single software application or one or more screes thereof. When the user attempts to exit the software application, the MR device may redirect the user to, for example, the login screen asking the user to log onto the MR device again, or the MR device may prompt the user with a message indicating that the MR device is currently in a kiosk mode that restricts the user to the single software application. In some embodiments, an MR device placed in the kiosk mode may exit the kiosk mode by, for example, a PIN (personal identification number) code.

In some embodiments, configuring or modifying a profile may include restricting a profile to a specific user or a specific group of users or restricting a user or a specific group of users to one or more specific profiles at 210D so that any profiles other than the one or more specific profiles may not be applied to MR devices managed by the management application.

Figure 2E:
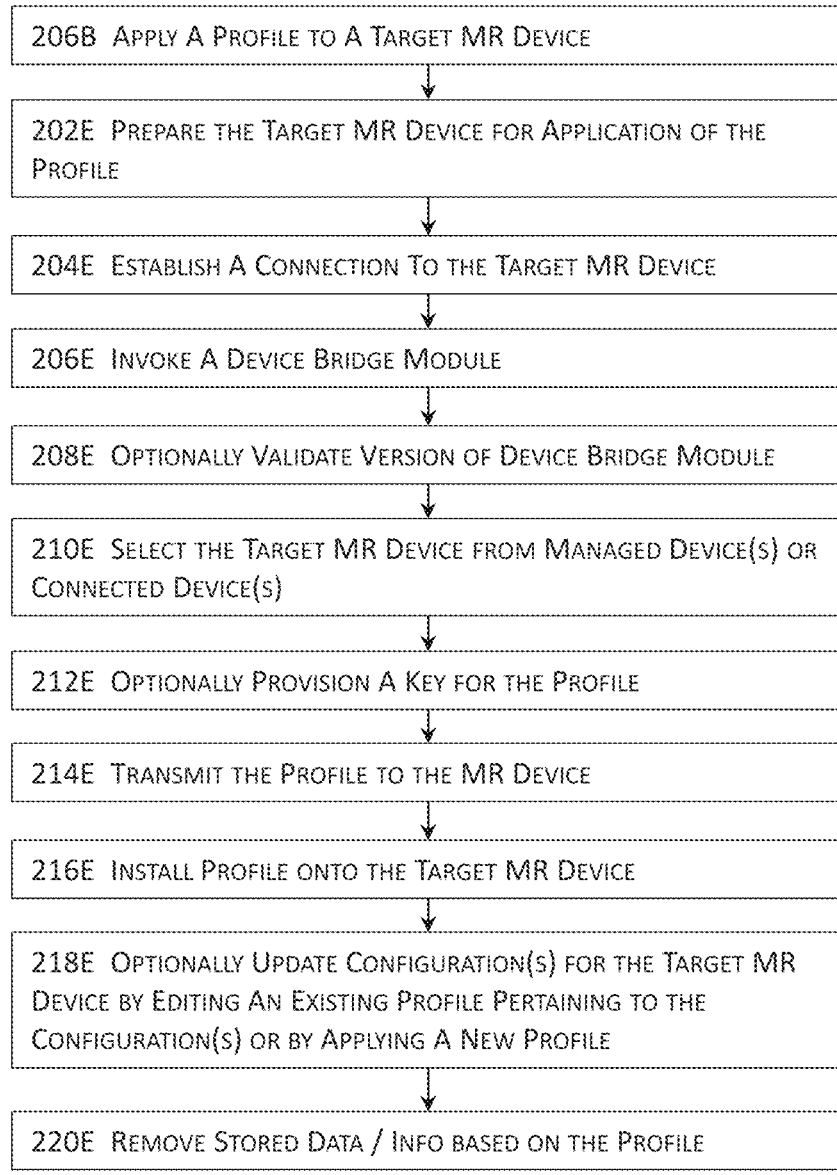
FIG. 2E illustrates more details about another portion of the more detailed flow diagram illustrated in FIG. 2B in one or more embodiments.

FIG. 2E illustrates more details about another portion of the more detailed flow diagram illustrated in FIG. 2B in one or more embodiments. More specifically, FIG. 2E illustrates more details about applying a profile to a target MR device at 206B in FIG. 2B. In these embodiments, a target MR device may be prepared at 202E. Preparing the target MR device may include, for example, ensuring the target MR device is fresh or has been factory reset. Preparing the target MR device may further include downloading an appropriate profile (e.g., a profile authorized for a user or a group of users) and one or more keys, if needed. For example, the decryption of an encrypted profile may require a key, and the preparation of the MR device may include obtaining (e.g., by pushing the key to the target MR device or by pulling the key from the target MR device) from a remote repository (e.g., 108B). In some embodiments, preparing a target MR device may include ensuring that the software development kit (SDK) is up-to-date so that the subsequent operations conform to the up-to-date standards and requirements.

A connection may be established at 204E between the target MR device and a computing device that is to apply a profile to the target MR device. As described above, profiles may be side-loaded or may be wirelessly applied to MR devices. The target MR device may be connected to the computing device via a wired connection (e.g., a USB cable, a USB-C cable, an Ethernet cable) or via a wireless connection (e.g., via a Wi-Fi network connection, a cellular data network, etc.) MR devices may be manufactured with or without a profile preinstalled. For enterprise MR device management, the first profile to be applied or installed to an MR device may be side-loaded when no network connection has been established at the time the profile is to be applied to the MR device.

A device bridge module may be invoked at 206E. Side loading a profile may first connect the target MR device to a computing device and establish a connection between the target MR device and the computing device with a device bridge module in the management application, and this device bridge module may be identified at 206E. A connection may then be established between an MR target device and the computing device by using the device bridge module, and commands, profile, key(s), etc. may be applied to the target MR device via the connection. The version of the device bridge module may be optionally verified or validated at 208E to ensure that the appropriate version is used. In some embodiments where multiple target MR devices are connected to the computing device performing the management functions, one or more target MR devices may be selected at 210E from a list of connected MR devices presented in, for example, the management portal (e.g., 118A) of the management software application.

In some embodiments where the profile is optionally encrypted, one or more keys may be optionally provisioned at 212E for the encrypted profile. For example, provisioning a key to a target MR device may be accomplished with the following pseudo instructions from the management software application on a Windows-based computing device in some embodiments:

set /p key=<%HOMEPATH%\Downloads\key
    db provision set-key %key%

Provisioning a key to a target MR device may be accomplished with the following pseudo instructions from the management software application on a Mac or Linux computing device in some embodiments:

db provision set-key $(cat ~/Downloads/key)

The appropriate profile may then be transmitted to the one or more selected target MR devices at 214E via their respective connections to the computing device. For example, transmitting a profile ("profile.zip") to a target MR device from a Windows-based computing device may be accomplished with the following pseudo instructions from the management software application:

db provision install %HOMEPATH%\Downloads\profile.zip

Transmitting a profile ("profile.zip") to a target MR device from a Mac or Linux computing device may be accomplished with the following instructions from the management software application:

db provision install ~/Downloads/profile.zip

The appropriate profile may then be applied or installed onto the one or more selected MR devices at 216E. At 218E, applying a profile to a target MR device may include updating the configurations of the MR device at 218E at least by editing corresponding entries of an existing profile corresponding to the configurations or by applying a new profile including the updated configurations. At 220E, data or information stored on the one or more selected target MR devices may be removed based at least in part upon the profile applied to the one or more selected target MR devices. In some embodiments, wiping data on a target MR device may also be accomplished by applying a wiping profile or a resetting profile (that resets an MR device to factory default and wipes the data stored thereon) to the target MR device. Wiping data on a target MR device may permanently erase all data pertaining to user(s) of the target MR device in some embodiments or erase some but not all data pertaining to user(s) of the target MR device in some other embodiments. For example, device configuration data pertaining to a specific user may be retained although the other data related to the specific user may be permanently erased.

FIG. 3A illustrates a topology of an example profile for management of mixed reality systems or devices in one or more embodiments. This example profile 300A illustrated in FIG. 3A includes multiple sections that include, without limitation, a first section 302A that provides general information or data such as the identifier of the example profile, a description of, for example, intended purpose of the profile, one or more support messages and/or help files for the MR device users who may seek help from, the date on which the profile is created and/or last updated, the version and/or identifier of a schema corresponding to the profile, and/or the identifier of the originator for this profile, etc. In some embodiments, this first section 302A may include offline profile update capability and/or configuration that determines whether the profile is allowed to be updated via side-loading and/or wirelessly when the MR device to which the profile is applied is not connected to any network.

The example profile 300A may include a second section 304A that includes one or more editable or selectable device settings, configurations, etc. The one or more device settings may include, for example, whether backup of data, settings, and/or configurations, etc. pertaining to the MR device or the user(s) is enabled or disabled, and this backup setting may be changed from enabled to disabled or vice versa in some embodiments. The one or more settings may further include, for example end-user license agreement(s), an adjustable setting for whether factory reset is allowed or disallowed, an adjustable setting for time (e.g., 12-hour display format or 24-hour display format), an adjustable setting for do not disturb which, when enabled, will not present any messages, notices, etc. to the user until disabled, or any other suitable settings pertaining to the hardware, software, user(s), and/or applications, etc.

The example profile 300A may include a third section 306A that includes editable information, data, and/or settings pertaining to connectivity for the MR device to which the example profile is applied. The connectivity section 306A may indicate or specify whether specific type(s) of connections is (are) permitted for the MR device to which the example profile is applied. For example, the connectivity section 306A may indicate whether Bluetooth connection is allowed or restricted for users of the MR device to connect a Bluetooth peripheral or device to the MR device. The connectivity section 306A may further specify preset wireless network(s) so the MR device to which the example profile is applied connects automatically to the preset network without user interactions or intervention. The connectivity section 306A may further specify a list of permissible networks that the MR device to which the example profile is applied is allowed to connect to or a list of unauthorized or undesired networks so that as to restrict the MR device to connect to only the list of permissible networks or to restrict the MR device from connecting to any of the list of unauthorized or undesired networks.

The example profile 300A may include a fourth section 308A that includes editable and/or non-editable information, data, and/or settings pertaining to privacy with a default for some or all of the editable information, data, and/or settings as non-editable in some embodiments. For example, the fourth section may include enablement/disablement for cloud processing for spatial mapping, whether an MR device to which the example profile is applied joins a shareable world model or other data sharing, any personal identification numbers, levels of privacy protection (e.g., enablement/disablement of social media trackers, cryptominers, cross-site tracking cookies, content tracking in one or more software applications, fingerprinters, etc.), enablement/disablement of local storage of login credentials, storage of historical data pertaining to the usage of an MR device and/or one or more software applications, permission to share location data, permission to access one or more hardware or software components by one or more peripheral devices, and/or permission to update software components pertaining to the hardware and/or software of an MR device, etc.

The example profile 300A may include a fifth section 310A that includes information or data pertaining to one or more keys that may be used for encryption and/or decryption purposes. For example, a profile may be encrypted when transmitted to an MR device. The fifth section 310A may include information about the key, the encryption, and/or the decryption of the encrypted profile. In some embodiments, the fifth section 310A may further include information pertaining to authentication, authorization, and/or one or more keys that may be used in authentication and/or authorization.

FIG. 3B illustrates a more detailed example profile for management of mixed reality systems or devices in one or more embodiments. This example profile includes four sections although other profiles may have fewer or more sections.

Figure 4:
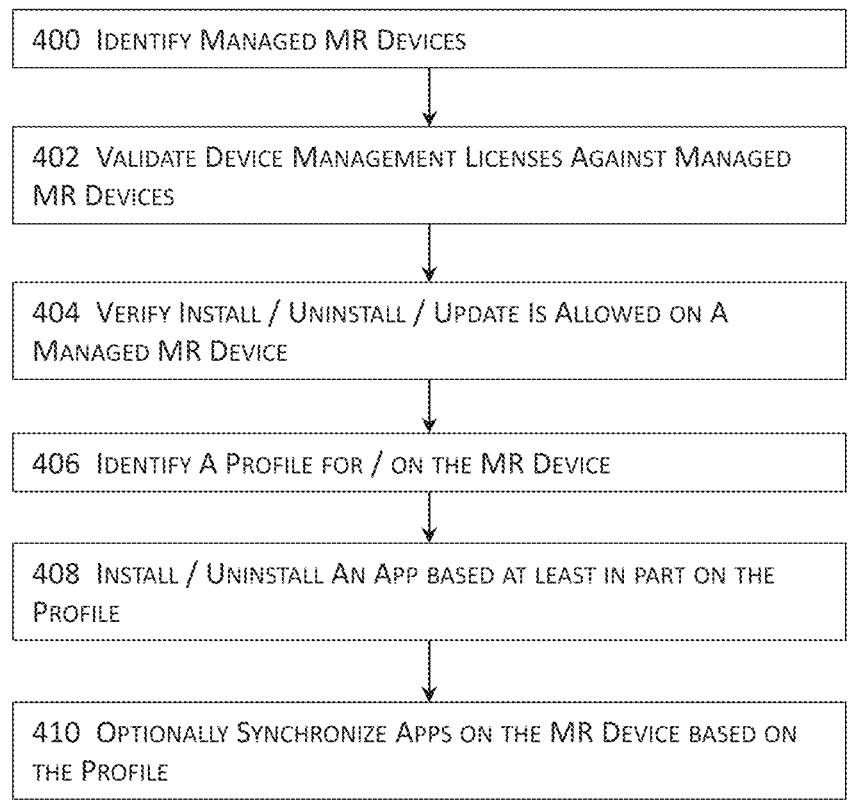
FIG. 4 illustrates another simplified high-level flow diagram for management of one or more mixed reality systems or devices in one or more embodiments.

FIG. 4 illustrates another simplified high-level flow diagram for management of one or more mixed reality systems or devices in one or more embodiments. More specifically, FIG. 4 illustrates a flow diagram for managing software applications on an MR device in some embodiments. At 400, one or more MR devices that are managed may be identified. For example, a business entity may own or lease a plurality of MR devices and may further a plurality of licenses for managing at least some of the plurality of MR devices.

The license of the management software application may be validated at 402 against a managed MR device in some embodiments. In some embodiments, an MR device is manageable via, for example, the management software application described herein when the MR device corresponds to a license which may be keyed to the MR device via software and/or hardware key(s) in some embodiments. In these embodiments, the management software application may be licensed on a per-seat and/or per-device basis so a business entity may provision and manage the same number of MR devices as the number of licenses allows.

In some of these embodiments, a license may be tracked and accounted for when a user of an MR device logs onto the MR device. In addition or in the alternative, a license of the management software application may be tied to a unique identifier of an MR device in some embodiments. For example, a license may be tied to the serial number, the MAC (media access control) address, and/or any other suitable identifiers that may uniquely identify the MR device in some embodiments. In some of these embodiments, the license may be transferred from a first managed MR device to a second managed MR device. In these embodiments after the transfer of the license, the first MR device is no longer managed by the management software application and may thus be required to be reset to factory settings.

An MR device associated with a license may be referred to as a managed MR device. On the other hand, a managed MR device may be removed from the pool of managed MR devices for a business entity in some embodiments. For example, a managed MR device may be factory reset (e.g., by applying a resetting profile to the managed MR device) to reset the MR device back to the factory settings. Once the MR device is reset to factory settings, the MR device is removed from the pool of managed MR devices for the business entity.

If the MR device was associated with a license prior to the reset, the management software application may send a notice or message to a user (e.g., an administrator) to notify the user that a license has been freed up, and that a specific MR device (e.g., an MR device identified by a unique identifier) is no longer managed by the management software application. In some of these embodiments, the freed-up MR device may be brought back to the pool of managed MR devices by, for example, applying a profile that is subject to the control of the management software application to the MR device.

In some embodiments, installation, uninstallation, and/or update of a software application on a managed MR device may be verified at 404. For example, a software may be acquired as a one-time purchase in some embodiments or through a subscription service in some other embodiments. Whether the application is amenable to installation or update may be verified by, for example, an application management module of the management software application through an automated or programmatic check on the validity of the seat of the software application.

Users may or may not have sufficient privileges or rights to install, uninstall, and/or update a software application. As a result, the management software application may further communicate with a managed MR device to identify the currently applied profile or any other pertinent information therefrom at 406 to determine whether a specific software application may be installed, uninstalled, or updated.

For example, a logged in user attempting to install, uninstall, or update a software application may not have sufficient privileges or rights to install, uninstall, or update a software application for a managed MR device. In this example, the respective management functions for installation, uninstallation, and/or update may be disabled. As another example where an admin logs into the management software application to install, uninstall, or update a software application for a managed MR device on behalf of a user, the management software application may identify the profile applied to the MR device or associated with the user to determine whether installation, uninstallation, and/or update of the software application is permitted for the managed MR device. For example, the management software application may retrieve a list of permissible software application or a list of impermissible software application from the profile, validate whether the profile is up to date, and determine whether the installation or update of the software application may proceed further. As another example, the management software application may further identify the currently applied profile to determine whether the managed MR device is placed in a kiosk mode and determine whether the installation or update of the software application may proceed further.

With the information from the currently applied profile identified at 406, a software application may be installed, uninstalled, or updated at 408 based at least in part upon the profile or the information therefrom. Optionally, the profile and/or the entirety of the software applications on the managed MR device may be synchronized, refreshed, and/or updated at 410 based at least in part upon the latest profile in some embodiments.

System Architecture Overview

Figure 5:
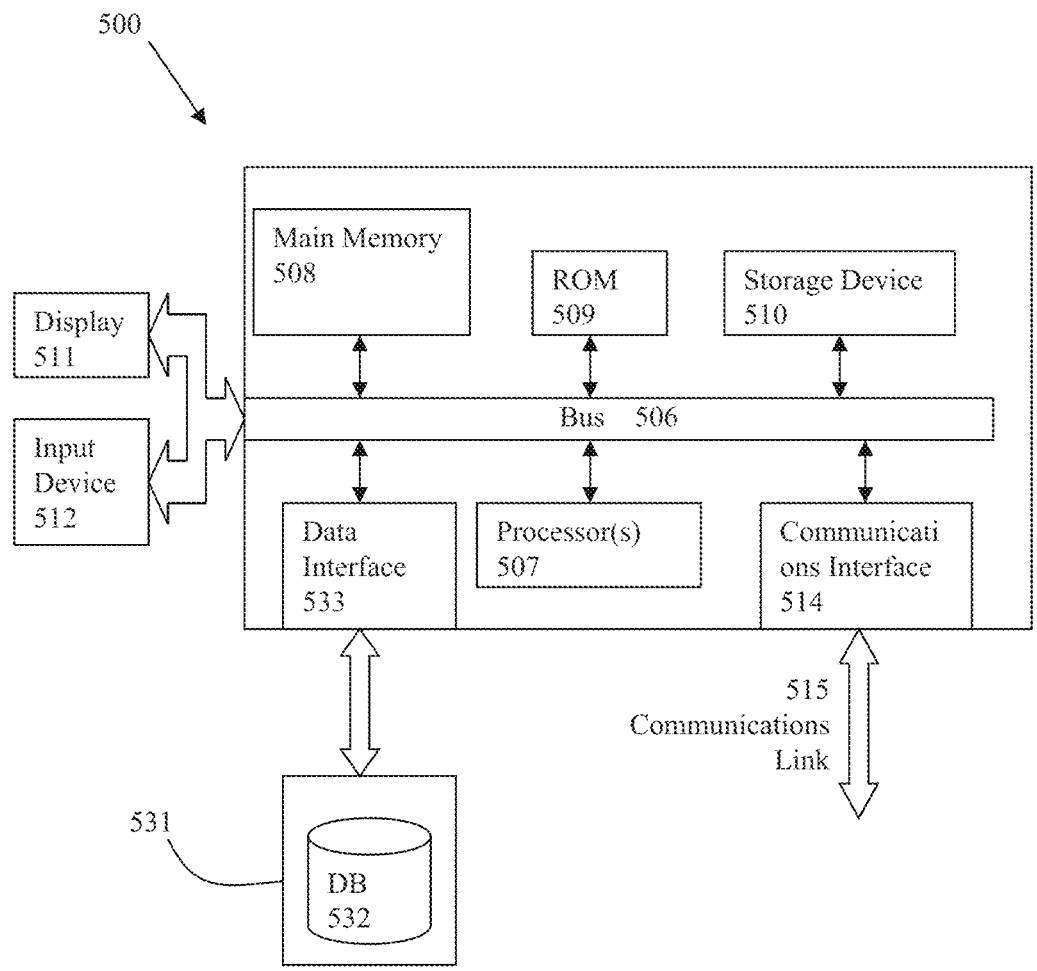
FIG. 5 illustrates a computerized system on which a method for management of mixed reality systems or devices may be implemented.

FIG. 5 illustrates a computerized system on which a method for management of mixed reality systems or devices may be implemented. Computer system 500 includes a bus 506 or other communication module for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown). The illustrative computing system 500 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 500 may include or may be a part of a cloud computing platform in some embodiments.

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, various acts of determination, identification, synchronization, calculation of graphical coordinates, rendering, transforming, translating, rotating, generating software objects, placement, assignments, association, etc. may be performed by one or more processors, one or more processor cores, or combination thereof.

The term "computer readable storage medium" or "computer usable storage medium" as used herein refers to any non-transitory medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program (e.g., application code) through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 that is readily accessible by the computer system 500. The computer system 500 communicates with the data storage system 531 through a data interface 533. A data interface 533, which is coupled to the bus 506 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method, comprising:
    authenticating and authorizing a user into an authorized user at a management software application;
    identifying one or more device management modules;
    provisioning a set of management modules performing a set of respective functions to the authorized user;
    receiving, from at least one management module in the set based at least in part upon an instruction from the authorized user, and executing one or more management instructions, wherein execution of the one or more management instructions causes a state of a mixed reality device, and the mixed-reality device is operatively connected to the management software application,
    redirecting the authorized user to a landing page for a management portal provided by the management software application;
    determining a position or an orientation in a prism for the landing page for the management portal; and
    provisioning one or more virtual input modules to user or the authorized user for the management software application.

2. The computer implemented method of claim 1, provisioning the set of management modules comprising:
    creating a new profile that is to be applied to the mixed-reality device.

3. The computer implemented method of claim 2, creating the new profile further comprising:
    presenting the new profile in a draft mode at least by setting a first state of the new profile to the draft mode;
    transforming the new profile into an edited profile at least by implementing one or more changes to the new profile in the draft mode; and
    updating the first state of the encrypted profile into an active mode.

4. The computer implemented method of claim 3, further comprising:
    storing the edited profile in a non-transitory computer accessible storage medium; and
    updating a second state of the edited profile into an approved state after the edited profile has been approved.

5. The computer implemented method of claim 3, further comprising:
    updating the first state of the edited profile into a generated mode; and
    encrypting the edited profile into an encrypted profile that has the generated mode.

6. The computer implemented method of claim 1, further comprising:
    configuring or modifying an existing profile pertaining to the mixed-reality device.

7. The computer implemented method of claim 6, configuring or modifying the existing profile further comprising at least one of:
    determining one or more permissible networks for the existing profile; or
    restricting or limiting whether a first user of the mixed-reality device is allowed to manage the mixed-reality device by changing one or more settings pertaining to the mixed-reality device.

8. The computer implemented method of claim 6, configuring or modifying the existing profile comprising at least one of:
    restricting or limiting an operation mode of the mixed-reality device for the first user of the mixed-reality device;
    restricting or limiting one or more permissible software applications that are permitted to execute on the mixed-reality device; or
    restricting or limiting one or more impermissible software applications that are not permitted to execute on the mixed-reality device.

9. The computer implemented method of claim 1, further comprising:
    applying a profile to the mixed-reality device.

10. The computer implemented method of claim 9, applying the profile further comprising:
    preparing the mixed-reality device;
    establishing a connection between the mixed-reality device and the management software application; and
    applying or installing the profile onto the mixed-reality device at least by modifying a state of the mixed-reality device with information or data in the profile.

11. The computer implemented method of claim 10, applying the profile further comprising:
    invoking or determining a device bridge module for the mixed-reality device and the management software application; and
    validating a version of the device bridge module.

12. The computer implemented method of claim 11, applying the profile further comprising:
  selecting the mixed-reality device from a pool of managed mixed reality devices presented in an interface of the management software application; and
  provisioning a key for the profile to the mixed-reality device.

13. The computer implemented method of claim 12, applying the profile further comprising:
  updating one or more configurations for the mixed-reality device at least by editing or modifying a first existing profile pertaining to the one or more configurations for the profile or by creating a first new profile for the profile; and
  removing data or information pertaining to one or more users from the mixed-reality device based at least in part upon the profile.

14. A system, comprising:
  a processor; and
  a non-transitory computer accessible storage medium storing thereupon a sequence of instructions which, when executed by the at least one processor, causes the processor to perform a set of acts, the set of acts comprising:
    authenticating and authorizing a user into an authorized user at a management software application;
    identifying one or more device management modules;
    provisioning a set of management modules performing a set of respective functions to the authorized user;
    receiving, from at least one management module in the set based at least in part upon an instruction from the authorized user, and executing one or more management instructions, wherein execution of the one or more management instructions causes a state of a mixed reality device, and the mixed-reality device is operatively connected to the management software application,
    redirecting the authorized user to a landing page for a management portal provided by the management software application;
    determining a position or an orientation in a prism for the landing page for the management portal; and
    provisioning one or more virtual input modules to user or the authorized user for the management software application.

15. The system for claim 14, the set of acts further comprising creating a new profile that is to be applied to the mixed-reality device, wherein creating the new profile further comprises:
  presenting the new profile in a draft mode at least by setting a first state of the new profile to the draft mode;
  transforming the new profile into an edited profile at least by implementing one or more changes to the new profile in the draft mode;
  updating the first state of the encrypted profile into an active mode;
  storing the edited profile in a non-transitory computer accessible storage medium;
  updating a second state of the edited profile into an approved state after the edited profile has been approved; and
  updating the first state of the edited profile into a generated mode;
  encrypting the edited profile into an encrypted profile that has the generated mode.

16. An extended reality system, comprising:
  a processor;
  a headset comprising at least one projector and configured to project virtual content of a virtual object to a user; and
  a non-transitory computer accessible storage medium storing thereupon program code which, when executed by the at least one processor, causes the processor to perform a set of acts, the set of acts comprising:
    authenticating and authorizing a user into an authorized user at a management software application;
    identifying one or more device management modules;
    provisioning a set of management modules performing a set of respective functions to the authorized user;
    receiving, from at least one management module in the set based at least in part upon an instruction from the authorized user, and executing one or more management instructions, wherein execution of the one or more management instructions causes a state of a mixed reality device, and the mixed-reality device is operatively connected to the management software application;
    selecting the mixed-reality device from a pool of managed mixed reality devices presented in an interface of the management software application;
    provisioning a key for a profile applied to the mixed-reality device;
    updating one or more configurations for the mixed-reality device at least by modifying the profile into a modified profile or by creating a new profile for the profile; and
    removing data or information pertaining to one or more users from the mixed-reality device based at least in part upon the modified profile or the new profile.

17. The extended reality system of claim 16, wherein the non-transitory computer accessible storage medium further stores thereupon the program code which, when executed by the processor, further causes the processor to perform the set of acts, and the set of acts further comprises configuring or modifying an existing profile pertaining to the mixed-reality device, configuring or modifying the existing profile comprising at least one of:
  determining one or more permissible networks for the existing profile;
  restricting or limiting whether a first user of the mixed-reality device is allowed to manage the mixed-reality device by changing one or more settings pertaining to the mixed-reality device;
  restricting or limiting an operation mode of the mixed-reality device for the first user of the mixed-reality device;
  restricting or limiting one or more permissible software applications that are permitted to execute on the mixed-reality device; or
  restricting or limiting one or more impermissible software applications that are not permitted to execute on the mixed-reality device.

* * * * *